United States Patent
Maschmeyer et al.

(10) Patent No.: US 12,505,585 B2
(45) Date of Patent: Dec. 23, 2025

(54) SYSTEMS AND METHODS FOR OVERLAY OF VIRTUAL OBJECT ON PROXY OBJECT

(71) Applicant: SHOPIFY INC., Ottawa (CA)

(72) Inventors: Russ Maschmeyer, Berkeley, CA (US); Eric Andrew Florenzano, San Francisco, CA (US); Brennan Letkeman, Calgary (CA); Diego Macario Bello, Montreal (CA); Daniel Beauchamp, Toronto (CA)

(73) Assignee: SHOPIFY INC., Ottawa (CA)

( * ) Notice: Subject to any disclaimer, the term of this patent is extended or adjusted under 35 U.S.C. 154(b) by 402 days.

(21) Appl. No.: 18/124,059

(22) Filed: Mar. 21, 2023

(65) Prior Publication Data
US 2024/0249442 A1    Jul. 25, 2024

Related U.S. Application Data

(60) Provisional application No. 63/440,154, filed on Jan. 20, 2023.

(51) Int. Cl.
*G06T 11/00*    (2006.01)
*G06V 20/20*    (2022.01)

(52) U.S. Cl.
CPC .............. *G06T 11/00* (2013.01); *G06V 20/20* (2022.01)

(58) Field of Classification Search
None
See application file for complete search history.

(56) References Cited

U.S. PATENT DOCUMENTS

| | | | |
|---|---|---|---|
| 9,210,413 | B2 | 12/2015 | Grinberg et al. |
| 2017/0287218 | A1 | 10/2017 | Nuernberger et al. |
| 2018/0005441 | A1 | 1/2018 | Anderson |
| 2018/0096536 | A1 | 4/2018 | Goto et al. |
| 2018/0114365 | A1* | 4/2018 | Egri ...................... G06T 19/006 |
| 2019/0139320 | A1* | 5/2019 | Davies .................... G06T 19/20 |
| 2019/0146219 | A1* | 5/2019 | Rodriguez, II ....... G06F 3/0482 |
| | | | 345/633 |

(Continued)

OTHER PUBLICATIONS

Suzuki et al. "Grasping a Virtual Object with a Bare Hand". ACM SIGGRAPH 2014 Posters (Vancouver, Canada). Association for Computing Machinery, New York, NY, USA. Article 51, Aug. 10-14, 2014. 1 page.

(Continued)

*Primary Examiner* — Sarah Le

(57) ABSTRACT

To improve user experience when interacting with AR content within an AR environment, the AR content may be overlaid over a proxy object in a real-world space. However, issues such as the AR content and the proxy object not being aligned, or occlusion of the proxy object leading to glitching of the AR content, may decrease user enjoyment. In some embodiments, an AR system for the overlay of AR content may be implemented. The system may anchor a virtual model to the proxy object based on detected features on the proxy object. The anchoring may include aligning elements of the virtual model and proxy object. In response to an occluding object occluding some features on the proxy object, the system may anchor the virtual model to the occluding object, or to both the proxy object and the occluding object, based on detected features on the occluding object.

21 Claims, 14 Drawing Sheets

(56) References Cited

U.S. PATENT DOCUMENTS

| | | |
|---|---|---|
| 2020/0258315 A1 | 8/2020 | Li et al. |
| 2021/0097766 A1* | 4/2021 | Palangie ................ G06F 3/017 |
| 2022/0092857 A1 | 3/2022 | Haapoja et al. |
| 2022/0100265 A1* | 3/2022 | Kies ....................... G06F 3/017 |
| 2022/0300120 A1 | 9/2022 | Nishibe et al. |
| 2024/0118786 A1* | 4/2024 | Ramani ................ G06V 40/28 |

OTHER PUBLICATIONS

Khan, Jamshed. "Guide to Image Inpainting: Using machine learning to edit and correct defects in photos". Heartbeat. Published Aug. 7, 2019. Retrieved Mar. 21, 2023, from https://heartbeat.comet.ml/guide-to-image-inpainting-using-machine-learning-to-edit-and-correct-defects-in-photos-3c1b0e13bbd0. 19 pages.

"Merge Cube | AR/VR Learning & Creation". Merge. Published in 2023. Retrieved Mar. 21, 2023, from https://mergeedu.com/cube. 4 pages.

\* cited by examiner

FIG. 13

E-Commerce Platform | Search | John's Apparel / Jonny B. Good (JG)

- Home
- Orders
- Products
- Customers
- Reports
- Discounts
- Apps

SALES CHANNELS ⊕
- Online Store
- Mobile App
View all channels

Settings

Good afternoon, Jonny B..
Here's what's happening with your store today.

Today's total sales   Today's visits
$98.00                1

● Update your Platform Payments tax details
We require additional information to verify your identity.
[Update tax details]

● Advanced Cash on Delivery has been deactivated for your store
[See why]

All channels ⌄          Today ⌄

TOTAL SALES
$98.00

$125                                    Jun 1
                                        2 orders
$75
$25
     12am   8pm   4pm   11pm TOTAL SALES BY CHANNEL    View dashboard    Jun 1

Online Store                              0 orders
$0.00

Mobile app                                0 orders
$0.00

Shopify POS (126 York St)                 0 orders
$0.00

SYSTEMS AND METHODS FOR OVERLAY OF VIRTUAL OBJECT ON PROXY OBJECT

CROSS-REFERENCE TO RELATED APPLICATIONS

This application claims the benefit of United States Provisional Patent Application No. 63/440,154 entitled "SYSTEMS AND METHODS FOR OVERLAY OF VIRTUAL OBJECT ON PROXY OBJECT", filed on Jan. 20, 2023, and incorporated herein by reference in its entirety.

FIELD

The present application relates to augmented reality, and in particular embodiments, to the overlay of augmented reality content over real-world objects and user interaction with augmented reality content.

BACKGROUND

In an augmented reality (AR) system, images of a real-world space surrounding a user device may be captured by a sensor, e.g., a camera on the device. The AR system may generate and present AR content on a display of the user device, the AR content overlaid onto a view of the real-world space.

AR differs from virtual reality (VR). VR relates to the creation of a completely virtual experience, whereas AR maintains at least a portion of the real-world experience, but alters the perception of that real-world experience using virtual content.

SUMMARY

Systems that create AR experiences for a user may involve overlaying a virtual model onto a real-world space. To try to improve user experience when interacting with a virtual model, the virtual model may be overlaid over a physical proxy object existing in the real-world space, e.g. to allow the user to seemingly physically interact with the virtual model and receive tactile feedback during the interaction via interactions with the physical proxy object.

Various technical challenges may arise in such scenarios where a virtual model is overlaid over a physical object for interaction.

The virtual model and the physical proxy object over which the virtual model is overlaid may not be aligned in a number of ways. Differences in dimension between the proxy object and the virtual model may be such that the proxy object is larger in one or more dimensions than the virtual model. This may result in portions of the proxy object appearing to protrude from behind the overlaid virtual model. Further, there may not be exact alignment of various edges or surfaces between the proxy object and the virtual model. When a user reaches out, for example with their hand, to seemingly physically engage with the virtual model, this unalignment between the proxy object and virtual model may result in the user feeling the interaction between their hand and the proxy object before visually simulated contact actually occurs between the user's hand and the virtual object, or vice versa. These flaws resulting from unalignment may break the sense of immersion and realism and may lead to a sub-optimal user experience.

Moreover, when the user physically interacts with the virtual model (i.e., engages in visually simulated physical interaction with the virtual model by interacting with the proxy object in the real-world space), at least some of the proxy object may be hidden from view by the user's actions, and consequently one or more of the features on the proxy object may no longer be visible by an AR system. For example, the user may grab the proxy object, thus occluding a portion of the object from the system's view. The user may subsequently move the proxy object, desiring for the virtual model to be moved in the same way. Current AR systems may fail to detect the proxy object continually and accurately in response to such changes, resulting in errors such as glitching or disappearance of the virtual model, leading to flaws that decrease a user's enjoyment of the AR system.

In some embodiments, an AR system may be implemented to provide an AR experience for a user. The system may detect a set of features on the proxy object, and may anchor a virtual AR model to the proxy object using the set of features so that the virtual model tracks movement of the features, i.e., the position and/or orientation (e.g., angle, degree of rotation, etc.) of the virtual model can be altered by physically altering the position and/or orientation of the proxy object. Anchoring the virtual model to the proxy object may include aligning one or more elements (e.g., edges, boundaries, points, axes, shapes, etc.) of the virtual model and proxy object. This alignment may improve a user's tactile experience when physically interacting with the virtual model.

A subsequent change may result in one or more features of the set of features becoming occluded from the visual field of the user device. In response, the AR system may anchor the virtual model to the occluding object using one or more detected features on the occluding object, and may also maintain the anchoring of the virtual model to the proxy object using any unoccluded detected features on the proxy object. In other words, the one or more features on the occluding object, or the combination of the one or more features on the occluding object and the features on the proxy object which remain unoccluded, may make up a different set of features upon which the virtual model can be anchored.

At any instance while the virtual model is anchored to the proxy object and/or the occluding object, the shapes and/or sizes of the virtual model and the proxy object may be such that at least a portion of the proxy object remains visible in the visual field of the user device. In such cases, the system may conceal any visible portions of the proxy object within the visual field of view by visually altering a portion of the view corresponding to the region of the proxy object. For example, pixels corresponding to visible portions of a proxy object may be removed from the visual field, and replaced with respective pixels which approximate the real-world space which is hidden in the visual field by the portions. This may be achieved, for example, using machine learning techniques, such as image inpainting.

Thus, the AR system of some embodiments may address the technical challenges described above in relation to current AR systems which do not hide portions of a proxy object protruding from behind a virtual AR model, do not account for lack of alignment between a virtual model and a proxy object, or are prone to lead to the glitching or disappearance of a virtual model when the model is affected by an occluding object.

In some embodiments, there is provided a computer-implemented method. The method may include a step of detecting a first set of features on a physical object in a real-world space within a visual field of view. The method may further include a step of anchoring AR content to the physical object using the detected first set of features. For example, the AR content may be a virtual model as described herein, or possibly other virtual content. The method may further include a step of detecting a second set of features on an occluding object in the real-world space within the visual field of view. The method may further include, responsive to the occluding object occluding one or more features of the detected first set of features, anchoring the AR content to at least the occluding object using the detected second set of features.

In some embodiments, the method may further include a step of anchoring the AR content to both the occluding object using the detected second set of features and the physical object using one or more of the detected first set of features that is not occluded by the occluding object. In some embodiments, anchoring the AR content to both the occluding object and the physical object may include a step of aligning the AR content with the physical object by rendering the AR content overlaid over at least a portion of the physical object with an element of the AR content aligned with a respective element of the physical object. Anchoring the AR content to both the occluding object and the physical object may further include a step of maintaining the aligning during movement of both the occluding object and the physical object. In some embodiments, maintaining the aligning includes maintaining the anchoring to both the occluding object and the physical object during movement of both the occluding object and the physical object.

In some embodiments, the element of the AR content may be an axis of the AR content, and the respective element of the physical object may be an axis of the physical object. In some embodiments, the element of the AR content may be a shape of at least a portion of the AR content, and the respective element of the physical object may be a shape of at least a portion of the physical object.

In some embodiments, the anchoring of the AR content to both the occluding object and the physical object may further be responsive to determining that the one or more of the detected first set of features that is not occluded by the occluding object and the detected second set of features on the occluding object are moving together. In some embodiments, determining that the one or more of the detected first set of features that is not occluded by the occluding object and the detected second set of features on the occluding object are moving together may include detecting that a distance between a first feature of the one or more of the detected first set of features that is not occluded by the occluding object and a second feature of the detected second set of features on the occluding object is substantially constant.

In some embodiments, anchoring the AR content to at least the occluding object may be further responsive to determining that the occluding object is in contact with the physical object.

In some embodiments, the AR content may be anchored to the physical object at a first alignment wherein a boundary of the AR content closest to the occluding object is not aligned with a respective boundary of the physical object closest to the occluding object. In such embodiments, the method may further include a step of detecting that the occluding object is approaching the physical object from a particular direction, and responsive to the detecting that the occluding object is approaching the physical object from the particular direction, modifying the anchoring of the AR content to the physical object to a second alignment wherein the boundary of the AR content closest to the occluding object is aligned with the respective boundary of the physical object closest to the occluding object.

In some embodiments, the method may further include a step of, prior to anchoring the AR content to the physical object, overlaying the AR content over at least a portion of the physical object, maintaining the AR content at a fixed position while the physical object moves, receiving an input indicating that the AR content is to anchor to the physical object, anchoring the AR content to the physical object. Anchoring the AR content to the physical object may occur subsequent to receiving the input.

In some embodiments, the method may further include, responsive to the occluding object no longer occluding the one or more features of the detected first set of features, anchoring the AR content to the physical object using the detected first set of features.

In some embodiments, there is a provided another computer-implemented method. The method may include a step of overlaying AR content onto a physical object in a real-world space within a visual field of view. The method may further include, responsive to detecting that a region of the physical object remains visible within the visual field of view subsequent to the overlaying of the AR content onto the physical object, concealing the region of the physical object within the visual field of view by visually altering a portion of the view corresponding to the region of the physical object.

In some embodiments, visually altering the portion of the view corresponding to the region of the physical object may include visually altering at least some pixels corresponding to the region of the physical object. Visually altering the at least some pixels may include altering a respective pixel value of each pixel of the at least some pixels based on an area of the real-world space within the visual field of view outside of the region of the physical object that is not covered by the AR content.

In some embodiments, the method may further include a step of detecting a set of features on the physical object within the visual field of view, and a step of anchoring the AR content to the physical object using at least one of the detected set of features.

In some embodiments, detecting that the region of the physical object remains visible within the visual field of view may include detecting that a subset of the detected set of features is not overlaid with the AR content.

In some embodiments, anchoring the AR content to the physical object may include aligning the AR content with the physical object by rendering the AR content with an element of the AR content aligned with a respective element of the physical object, and maintaining the aligning during movement of the physical object so that the region of the physical object which remains visible within the visual field of view remains substantially the same during the movement. In some embodiments, maintaining the aligning during movement of the physical object includes maintaining the anchoring to the physical object during the movement. In some embodiments, the aligning may include the element of the AR content being aligned with the respective element of the physical object such that the region of the physical object which remains visible within the visual field of view is a single continuous region.

In some embodiments, the aligning the AR content with the physical object may include determining a plurality of possible alignments between the AR content and the physical object. Each of the plurality of possible alignments may include one element of the AR content aligned with a respective one element of the physical object. The aligning the AR content with the physical object may further include selecting one of the plurality of possible alignments for the aligning the AR content with the physical object. The selected one of the plurality of possible alignments may have only a single continuous region as the region of the physical object which remains visible within the visual field of view.

In some embodiments, the method may further include, responsive to detecting that a portion of the region of the physical object which remains visible within the visual field of view has become occluded within the visual field of view, no longer concealing the portion that has become occluded. In some embodiments, the portion of the region of the physical object may become occluded within the visual field by an occluding object. In some embodiments, the portion of the region of the physical object may become occluded within the visual field by the AR content.

A system is also disclosed that is configured to perform the methods disclosed herein. For example, the system may include at least one processor to directly perform (or instruct the system to perform) the method steps. In some embodiments, the system includes at least one processor and a memory storing processor-executable instructions that, when executed, cause the at least one processor to perform any of the methods described herein.

In another embodiment, there is provided a computer readable medium having stored thereon computer-executable instructions that, when executed by a computer, cause the computer to perform operations of the methods disclosed herein. The computer readable medium may be non-transitory.

BRIEF DESCRIPTION OF THE DRAWINGS

Embodiments will be described, by way of example only, with reference to the accompanying figures wherein:

FIG. 13 is an example of a home page of an administrator, according to some embodiments.

DETAILED DESCRIPTION

For illustrative purposes, specific embodiments will now be explained in greater detail below in conjunction with the figures.

AR is becoming more prevalent as the technology behind it becomes more sophisticated and affordable. AR applications may be applied to many different industries, and can enhance and enrich a user's experience. For example, a user's mobile device such as a phone or a tablet may be used to overlay AR content, such as a virtual model of an object, onto a representation of the user's real-world environment so that it appears as if the virtual model is actually in the real-world environment within the display screen of the device. The user may wish to interact with the AR content within the real-world space in various ways.

To improve user experience, AR systems may overlay the virtual model onto a real-world object, thereby providing an object which the user can physically touch and receive tactile feedback from, while seemingly interacting with the virtual model.

However, various technical problems may arise in such AR systems. The virtual model and the physical proxy object over which the virtual model is overlaid may not be aligned in various ways. For example, differences in dimension between the proxy object and the virtual model may result in one or more portions of the proxy object appearing to protrude from behind the virtual model. Further, there may not be exact alignment of various edges or surfaces between the proxy object and the virtual model. Thus, a user may experience that the interaction between their hand and the proxy object occurs before the visually simulated contact occurs between the user's hand and the virtual object, or vice versa.

Moreover, when the user physically interacts with the virtual model (i.e., engages in visually simulated physical interaction with the virtual model by interacting with the proxy object in the real-world space), at least some of the proxy object may be hidden from view by the user's actions, and consequently one or more of the features on the proxy object may no longer be visible by an AR system. For example, the user may grab the proxy object, thus occluding a portion of the object from the system's view. The user may subsequently move the proxy object, desiring for the virtual model to be moved in the same way. Current AR systems may fail to detect the proxy object continually and accurately in response to such changes, resulting in errors such as glitching or disappearance of the virtual model.

In some embodiments, an AR system may be implemented to provide an AR experience for a user which addresses one or more of the above problems, as described in detail below.

Figure 1:
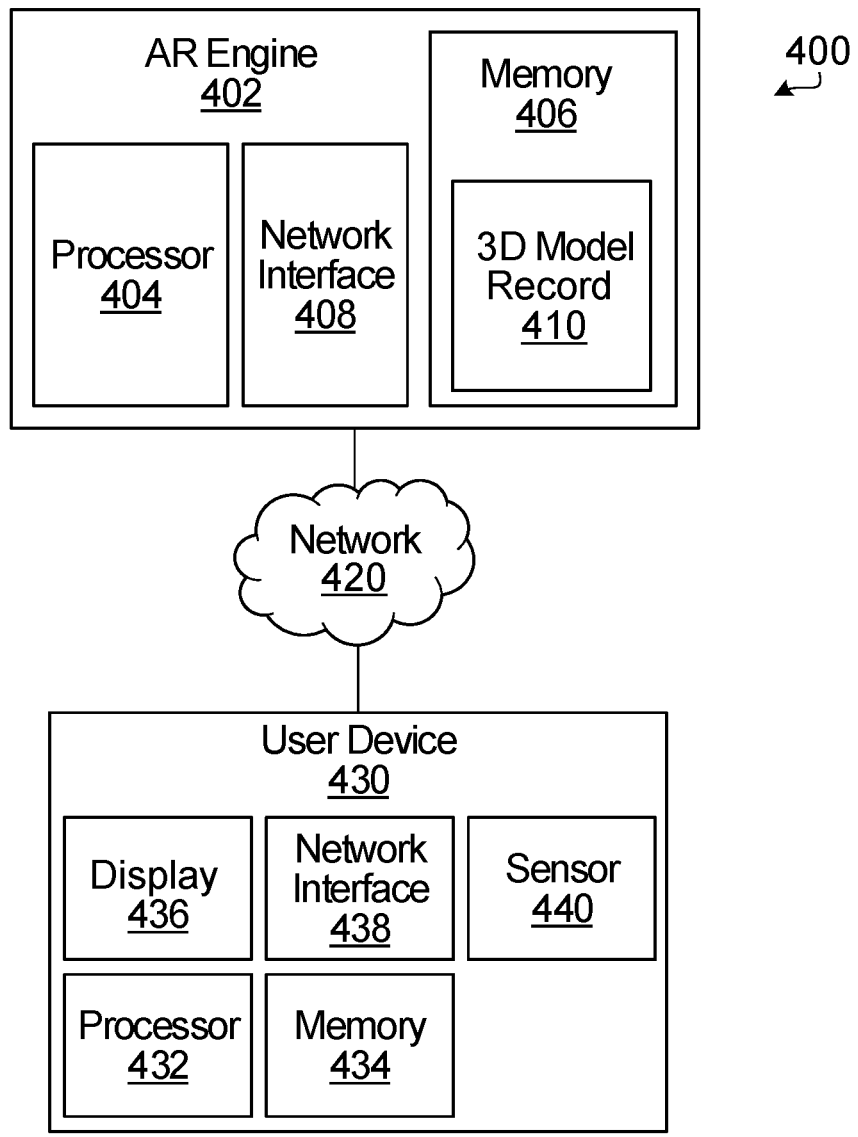
FIG. 1 is a block diagram illustrating a system for overlaying AR content, according to some embodiments.

FIG. 1 is a block diagram illustrating an example AR system 400 for overlaying AR content over a physical proxy object, according to some embodiments. The system 400 includes an AR engine 402, a network 420, and a user device 430.

The network 420 may be a computer network implementing wired and/or wireless connections between different devices, including the AR engine 402 and the user device 430. The network 420 may implement any communication protocol known in the art. Non-limiting examples of network 420 include a local area network (LAN), a wireless LAN, an internet protocol (IP) network, and a cellular network.

The AR engine 402 supports the generation of AR content. As illustrated, the AR engine 402 includes a processor 404, a memory 406, and a network interface 408.

The processor 404 directly performs or instructs all of the operations performed by the AR engine 402. The processor 404 may be implemented by one or more processors that execute instructions stored in the memory 406 or in another non-transitory computer readable medium. Alternatively, some or all of the processor 404 may be implemented using dedicated circuitry, such as an application specific integrated circuit (ASIC), a graphics processing unit (GPU) or a programmed field programmable gate array (FPGA).

The network interface 408 is provided for communication over the network 420. The structure of the network interface 408 is implementation specific. For example, the network interface 408 may include a network interface card (NIC), a computer port (e.g., a physical outlet to which a plug or cable connects), and/or a network socket.

The memory 406 may include a three-dimensional (3D) virtual model record 410. The memory 406 may further store instructions and algorithms related to the 3D model record 410 that are executed by the processor 404 of AR engine 402. For example, the 3D model record 410 may store virtual 3D models of objects, such as items, buildings, locations, scenery, persons, anatomical features, and animals. A user may search for and select virtual 3D models stored in the 3D model record 410. The virtual models stored in the 3D model record 410 may be obtained in various ways, as discussed in greater detail below. The virtual 3D models can then be generated and/or implemented within the AR experience by the processor 404, allowing the user to view and optionally interact with the virtual 3D models within the AR environment.

A 3D model is a specification of one or more virtual objects that can be rendered as AR content according to the specifications of the 3D model. A 3D model can be positioned or otherwise defined within a 3D virtual coordinate system, e.g. within a virtual coordinate system generated via simultaneous localization and mapping (SLAM) technology. The virtual coordinate system may be a cartesian coordinate system, a cylindrical coordinate system or a polar coordinate system, for example. A 3D model may be entirely computer-generated or may be generated based on measurements of a real-world entity. Possible methods for generating 3D models from a real-world entity include photogrammetry (creating a 3D model from a series of 2D images), and 3D scanning (moving a scanner around the object to capture all angles). Other methods of generating 3D models are possible.

A 3D model of an object allows for the object to be viewed at various different angles within an AR environment. For example, a user may be able to view various different angles of the object by moving their position in relation to the 3D model. Alternatively, the user may be able to view various different angles of the object by interacting with and moving the 3D model to show different angles.

A model stored in the 3D model record 410 can also have associated audio content and/or haptic content. For example, the 3D model record 410 could store sounds made by or otherwise associated with a model and/or haptic feedback associated with the model.

Although described as 3D model record 410, in some implementations 3D model record 410 may simply be a model record which stores models of any dimensions, such as 2D or 3D, that may be used by the AR engine 402. Throughout this application, the more general term "virtual model" may be used, which may encompass a model of any dimensions stored in the model record 410.

The user device 430 includes a processor 432, a memory 434, display 436, network interface 438 and sensor 440. Although only one user device 430 is illustrated in FIG. 1 for sake of clarity, AR engine 402 may interact with other user devices.

Display 436 can present to a user a real-world space as captured by a sensor, such as sensor 440, and can additionally present visual AR content to a user. Although not shown, user device 430 may also include an interface for providing input, such as a touch-sensitive element on the display 436, a button provided on user device 430, a keyboard, a mouse, etc. The interface may also include a gesture recognition system, a speaker, headphones, a microphone, and/or haptics. The interface may also provide output associated with the visual virtual content on the display 436, e.g. haptic and/or audio content. The display 436 may incorporate elements for providing haptic and/or audio content.

Alternatively, display 436 may allow a user to view the real-world space itself, as opposed to the real-world space as captured by a sensor, and additionally present AR content to a user. For example, in some embodiments, user device 430 may be a pair of AR glasses, and the display 436 may be a lens of the AR glasses. As with conventional glasses, the display 436 of the AR glasses may allow a user to see the real-world environment surrounding the user. Additionally, the display 436 may be able to present to the user AR content generated and overlaid over the view of the real-world space.

The network interface 438 is provided for communicating over the network 420. The structure of the network interface 438 will depend on how user device 430 interfaces with the network 420. For example, if user device 430 is a wireless device such as a mobile phone, tablet, headset or glasses, then the network interface 438 may include a transmitter/receiver with an antenna to send and receive wireless transmissions to/from the network 420. If the user device is a personal computer connected to the network with a network cable, then the network interface 438 may include, for example, a NIC, a computer port, and/or a network socket.

The sensor 440 may be provided to obtain measurements of the real-world space surrounding the user device 430. These measurements can be used to generate representations of the real-world space within which AR content created by the AR engine 402 can be placed. The sensor 440 may additionally capture or detect a real-world object and capture or detect movements of an object and movements performed by a user in the real-world space surrounding the user device 430, such as a hand action, motion or gesture. The sensor 440 may include one or more cameras, and/or one or more radar sensors, and/or one or more lidar sensors, and/or one or more sonar sensors, and/or one or more gyro sensors, and/or one or more accelerometers, and/or one or more inertial measurement units (IMU), and/or one or more ultra wideband (UWB) sensors, and/or one or more near field communication (NFC) sensors, etc. When the sensor 440 includes a camera, images captured by the camera may be processed by the AR engine 402. Measurements obtained from other sensors of the user device 430 such as radar sensors, lidar sensors and/or sonar sensors, can also be processed by the AR engine 402. Although the sensor 440 is shown as a component of the user device 430, the sensor 440 may also or instead be implemented separately from the user device 430 and may communicate with the user device 430 and/or the AR engine 402 via wired and/or wireless connections, for example.

The processor 432 directly performs or instructs all of the operations performed by the user device 430. Examples of these operations include processing inputs received from the user (e.g. via display 436 or another interface), processing inputs received from the sensor 440, preparing information for transmission over the network 420, processing data received over the network 420, and instructing the display 436 to display a real-world space captured by a camera and to display AR content overlaid onto the view of the real-world space with a particular layout. The processor 432 may be implemented by one or more processors that execute instructions stored in the memory 434 or in another non-transitory computer readable medium. Alternatively, some or all of the processor 432 may be implemented using dedicated circuitry, such as an ASIC, a GPU, or a programmed FPGA.

The AR engine 402 is provided by way of example. Other implementations of an AR engine are also contemplated. In some embodiments, an AR engine may be implemented as a stand-alone service to generate AR content. In some embodiments, an AR engine may be implemented at least in part by a user device and/or on a server associated with the user. For example, AR engine 402 could instead be implemented in part or in whole on the user device 430. A software application may be installed on the user device 430 that generates virtual content locally (i.e., on the user device 430). The software application may receive the 3D model record 410 and/or or any other data stored in memory 406 from the AR engine 402. In some embodiments, an AR engine may be provided at least in part by an e-commerce platform, either as a core function of the e-commerce platform or as an application or service supported by or communicating with the e-commerce platform.

Figure 2:
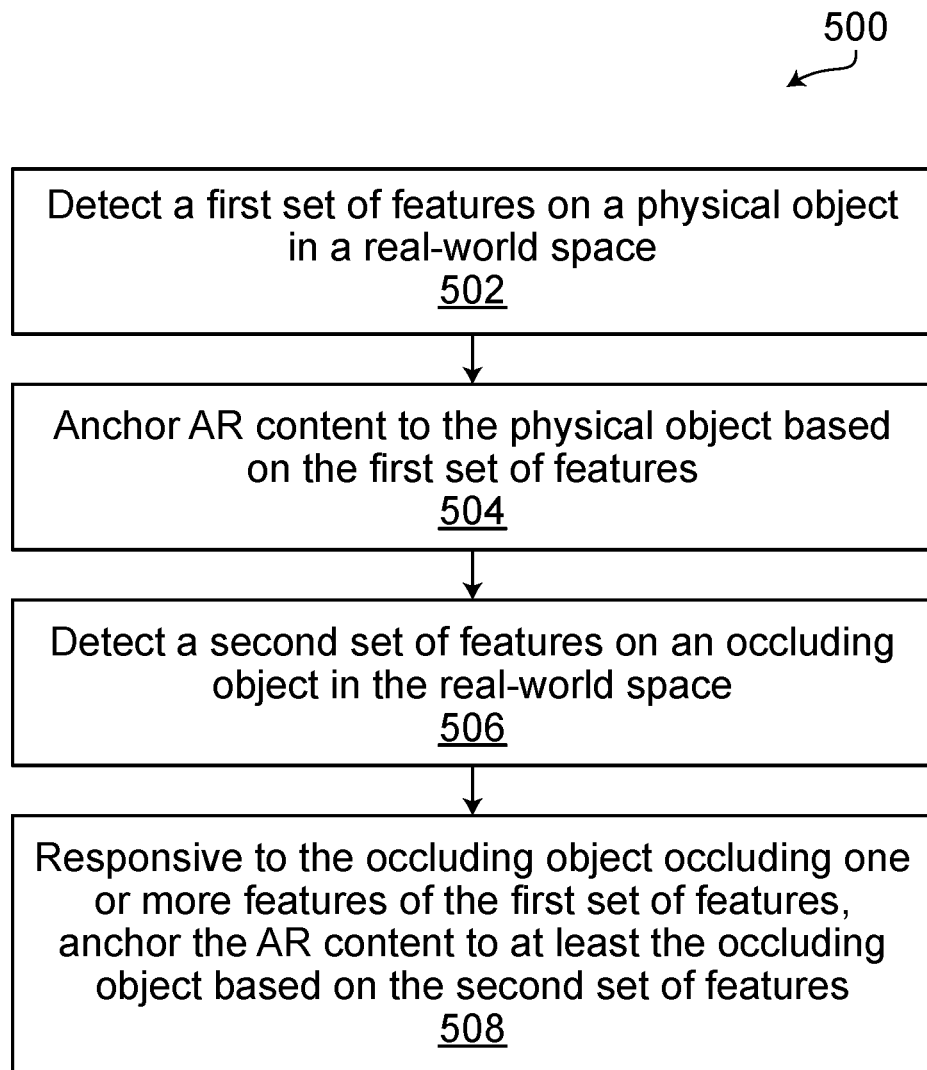
FIG. 2 illustrates a computer-implemented method, according to some embodiments.

FIG. 2 illustrates a computer-implemented method 500, according to some embodiments. The steps of method 500 are described as being performed by the processor 404 of AR engine 402 of FIG. 1, but this is only an example. At least a portion or all of the method 500 may instead be performed elsewhere, such as at the user device 430.

Figure 4:
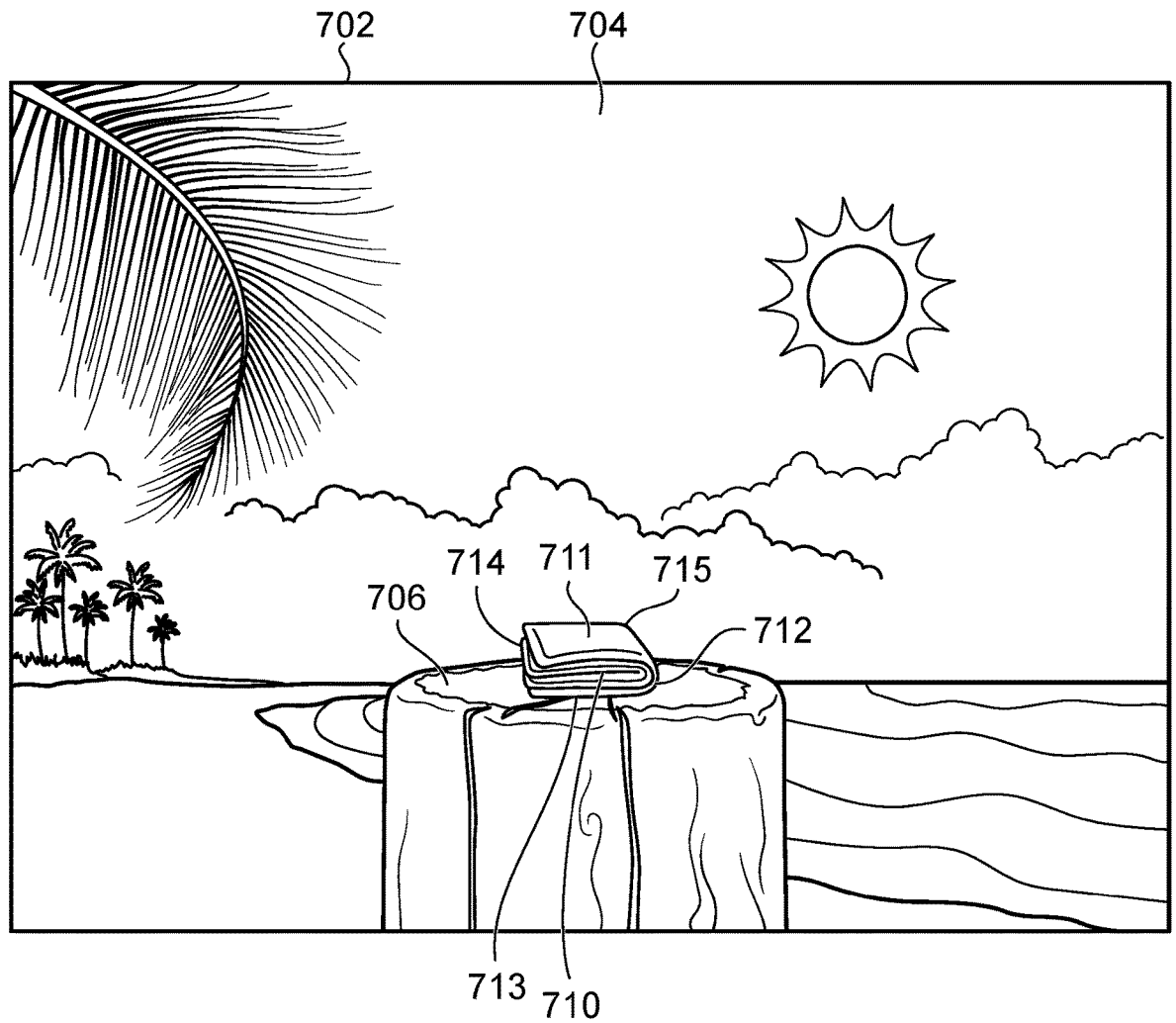
FIG. 4 illustrates an AR environment as viewed by a user device, the AR environment based on a real-world space surrounding the user device and the real-world space including an object, according to some embodiments.
Figure 8:
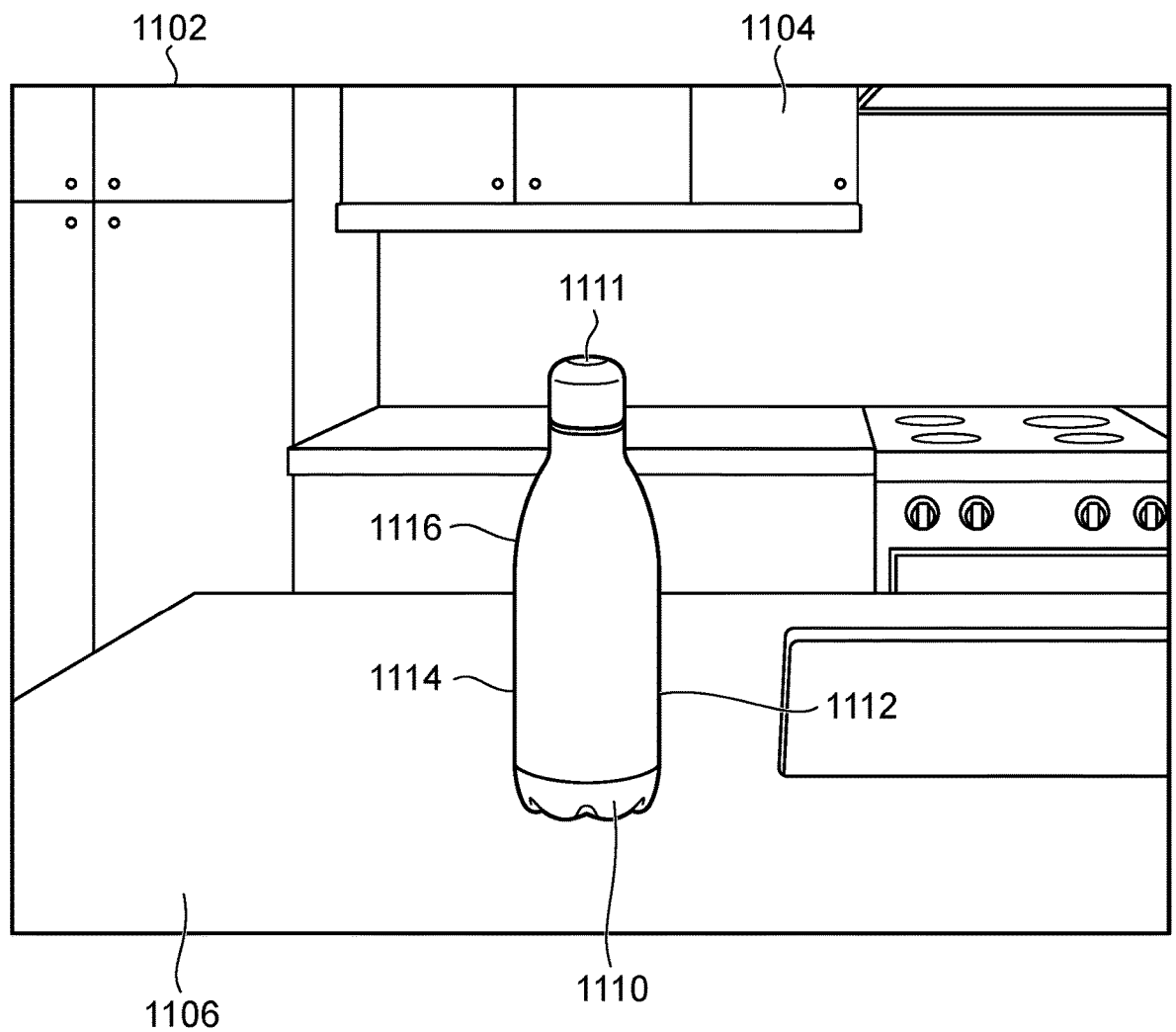
FIG. 8 illustrates another AR environment as displayed by a user device, the AR environment based on a real-world space surrounding the user device and the real-world space having an object, according to some embodiments.

At step 502, processor 404 may detect a first set of features on a physical proxy object (which may be described as "physical proxy object", "physical object" or "proxy object") in a real-world space within a visual field of view. The term "features" of a physical object may include a discrete point, an axis, a plane, a surface, a shape, or any other detectable element of the physical object, e.g. detected via processing of sensor data, such as image processing of images taken by the user device 430, and/or radar and/or lidar, etc. For example, FIGS. 4 and 8 show physical objects 710 and 1110, respectively. Processor 404 may detect a set of features for each of physical objects 710 and 1110, such as their central axis, their boundaries, their corner points, etc. A set of features may be defined as one or more features.

Figure 6:
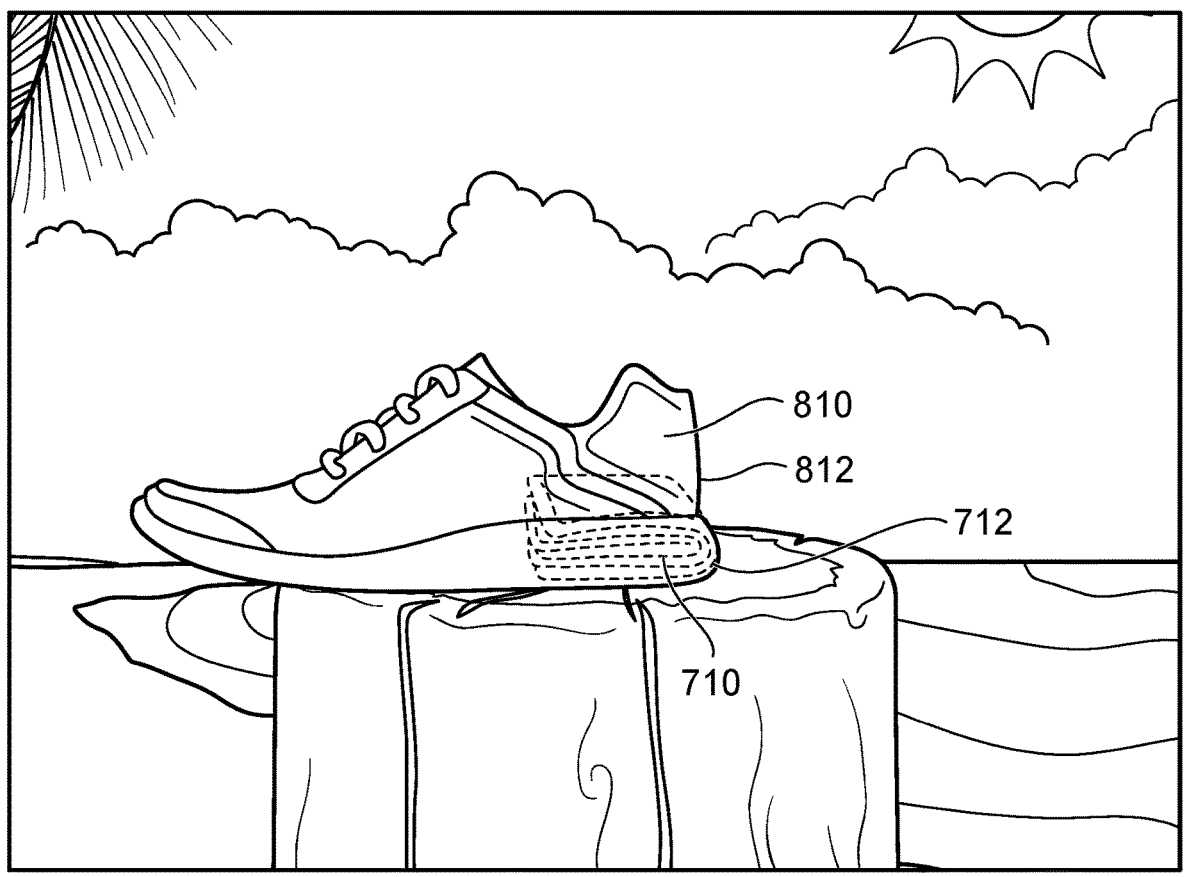
FIG. 6 illustrates the AR environment of FIG. 5, where the AR content is overlaid onto and/or anchored to the object at a second position, according to some embodiments.

At step 504, processor 404 may anchor AR content to the physical object using the detected first set of features. Therefore, features may alternatively be referred to as "anchor points". AR content may include one or more virtual models, which may be described as "virtual models", "virtual objects", "AR objects" or "AR models". To anchor AR content to a physical object using a set of features may mean that the AR content is presented as releasably fixed onto the physical object at a certain alignment in relation to the physical object, so that the AR content tracks the movement of the detected first set of features on the physical object. In other words, when the physical object is moved, AR content which is anchored to the physical object moves with the physical object to maintain the alignment, e.g. by being re-rendered at different locations/orientations as needed as the physical object moves to keep the alignment. More specifically, however the physical object is moved, AR content which is anchored to the physical object moves in the same direction, by the same amount of rotation, etc. as the physical object, e.g., in the six degrees of freedom. For example, FIG. 6 illustrates a virtual AR object 810 anchored to a physical object 710 at a specific orientation relative to the physical object 710. As shown, the virtual object 810 is anchored at a specific alignment with respect to the object 710—in the case of FIG. 6, the virtual object 810 is anchored so that from a side perspective view a rightmost edge/boundary of the physical object 710 aligns with a rightmost edge/boundary of the virtual object 810. If the physical object 710 is subsequently moved, for example by a user's hand, the anchored virtual object 810 will move in the same way such that the alignment is maintained between the physical and virtual objects 710, 810. In some embodiments, a physical object may include one or more sensors, such as a built-in IMU, an accelerometer, a gyroscope, etc., which may send data to the AR engine 402, and this data may be used by processor 404 to detect the location and/or orientation of the physical object at a given point in time. In some embodiments, a physical object may display a QR code which may provide information about the location and/or orientation of the physical object to the AR engine 402. When the physical object is equipped with a sensor or other means, such as a QR code, to provide its location and/or orientation data, AR content may be more accurately anchored to the physical object.

Figure 7:
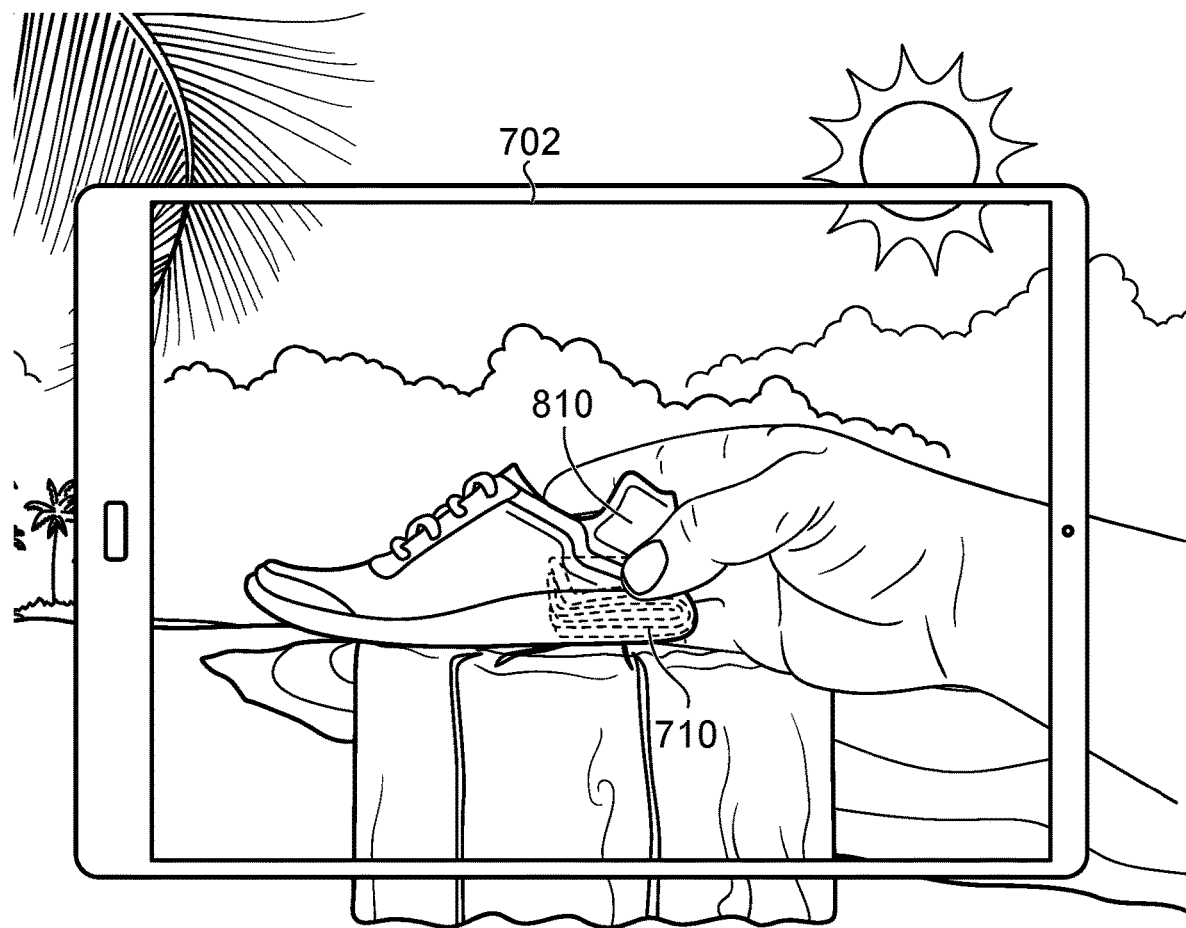
FIG. 7 illustrates a user device displaying the AR environment of FIG. 6, and a user interacting with the object, according to some embodiments.
Figure 10:
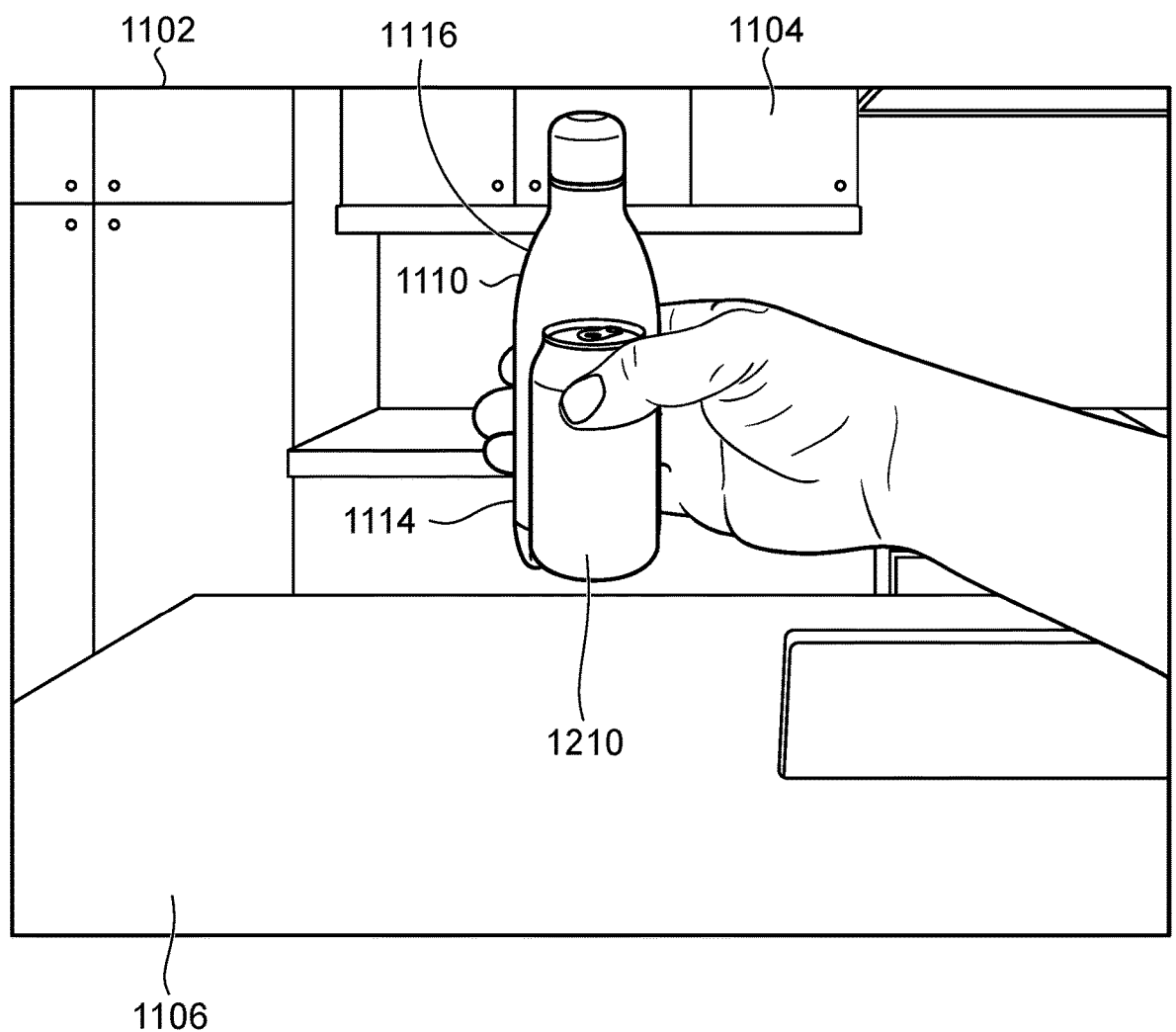
FIG. 10 illustrates the AR environment of FIG. 9, where AR content is anchored to the object at a particular position in the presence of an occluding object.

Returning to FIG. 2, at step 506, processor 404 may detect a second set of features on an occluding object in the real-world space within the visual field of view. The occluding object may occlude at least a portion of the physical object and/or the virtual object, from the user device. For example, FIG. 7 illustrates a user's hand occluding a portion of the physical object 710 and virtual object 810, and FIG. 10 illustrates a user's hand occluding a portion of the physical object 1110 and virtual object 1210. In some embodiments, the AR system 400 may, as depicted in FIGS. 7 and 10, render the virtual object "behind" the occluding object. This may create a more realistic AR experience, such as when the occluding object is a user's hand, as it will appear within the AR environment as though the user's hand is physically interacting with the virtual object. In some other embodiments, the AR system 400 may render the virtual model over the occluding object as well as the physical object so as to ensure that the user maintains a complete view of the AR object.

As shown in FIG. 7, the occluding object may be a user's hand. In other embodiments, the occluding object may be a physical object controlled by the user, such as a body part other than a hand, a stylus, or something else controlled by the user. Therefore, in any instance in the description where a user's hand is described as being the occluding object, any of these other objects may instead be the occluding object.

Returning to FIG. 2, at step 508, processor 404 may, responsive to the occluding object occluding one or more features of the detected first set of features, anchor the AR content to at least the occluding object using the detected second set of features. For example, in some embodiments the occluding object, such as a hand, may occlude most or all of the physical object such that most if not all of the detected first set of features on the physical object are hidden from the user device. In such embodiments, the AR content may become anchored to only the occluding object. In other words, there may be a transition of the anchoring of the AR content from the physical object to the occluding object, as explained in greater detail below.

Figure 9:
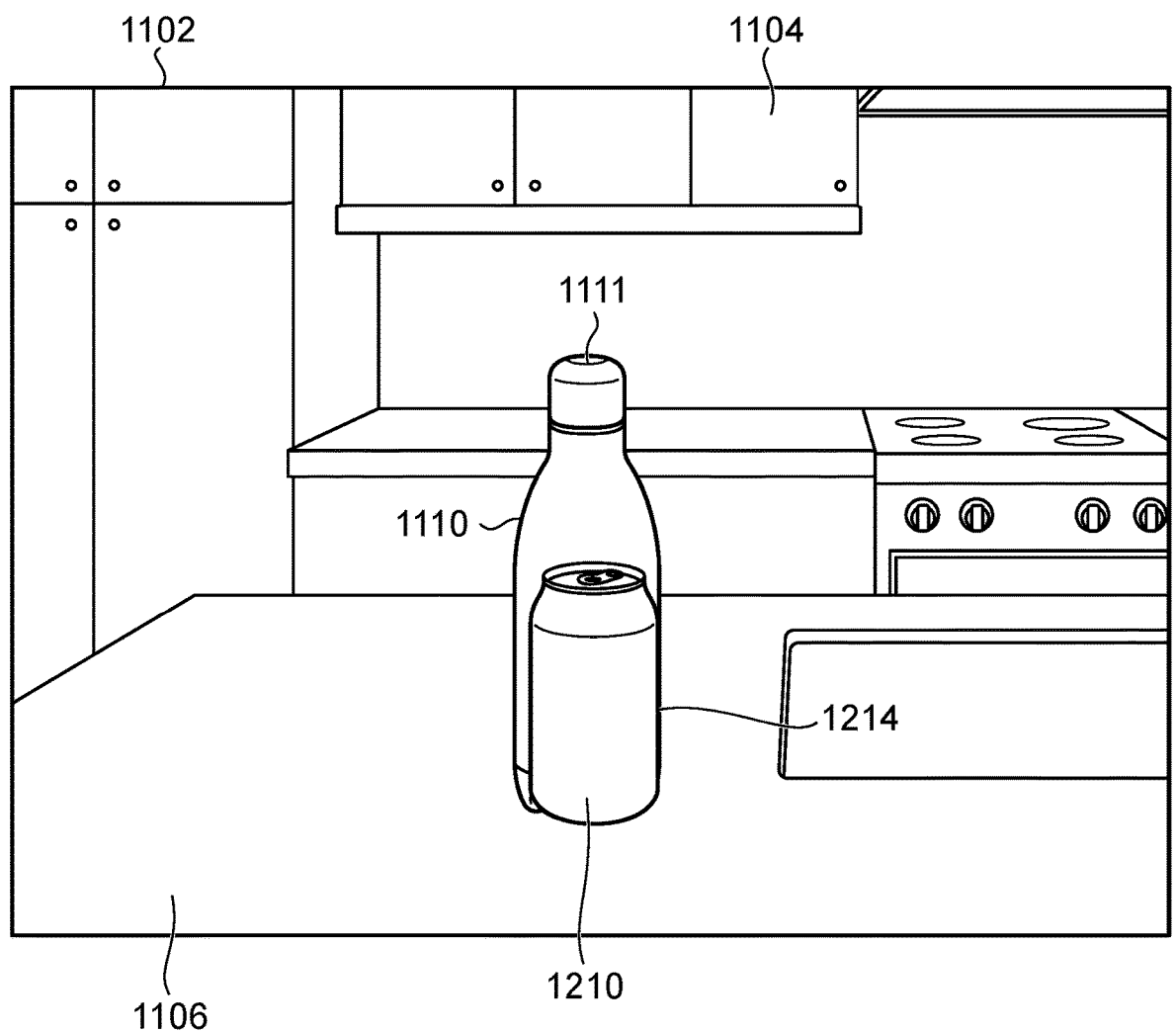
FIG. 9 illustrates the AR environment of FIG. 8, where AR content is overlaid onto and/or anchored to the object at a particular position, according to some embodiments.

In some embodiments, the AR content may be anchored to both the occluding object and the physical object. For example, FIG. 9 illustrates a virtual AR object 1210 anchored to the physical object 1110 using a first set of features detected on the physical object 1110. FIG. 10 then shows an embodiment where a user's hand occludes one or more of the detected first set of features of the physical object 1110. The user's hand is an occluding object with a second set of features which are detected by processor 404. In response to the occlusion, processor 404 may anchor the virtual object 1210 to the physical object 1110 using the features of the detected first set of features which remain visible, and the occluding object using the detected second set of features.

Some embodiments (such as when anchoring AR content to both the occluding object and the physical object) may include aligning the AR content with the physical object by rendering the AR content overlaid over at least a portion of the physical object with an element of the AR content aligned with a respective element of the physical object, and may further include maintaining the aligning during movement of both the occluding object and the physical object. In this context, the term "element" may be an axis, a shape, a boundary, an edge, a surface, a unique item or feature, etc. For example, in FIG. 9, processor 404 renders virtual object 1210 overlaid over a portion of the physical object 1110 at a particular alignment, namely with the bottom edge of the virtual object 1210 aligned with the bottom edge of the physical object 1110, and the rightmost edge of the virtual object 1210 aligned with the rightmost edge of the physical object 1110. Then, in FIG. 10 where the virtual object 1210 is anchored to both the physical object 1110 and the occluding object (i.e., the user's hand), it is shown that the alignment is maintained during movement of the hand and the physical object 1110 together.

In some embodiments, the processor 404 may anchor the AR content to both the occluding object and the physical object responsive to detecting that the features of the detected first set of features which remain visible and the detected second set of features on the occluding object are moving together. For example, in some embodiments, a different real-world object may occlude the physical object onto which AR content is anchored, e.g., because the user has moved to a position where the different object is positioned between the physical object and the user device, or a person or object moves past the user device in between the user device and the physical object. In such situations, the features of the detected first set of features which remain visible, i.e., the one or more of the detected first set of features that is not occluded by the occluding object, and the detected second set of features may be determined by the processor 404 as not moving together. Therefore, the AR content may remain anchored to only the physical object based on the features of the physical object which remain visible.

Determining that the features of the detected first set of features which remain visible and the detected second set of features on the occluding object are moving together may involve detecting that a distance between a feature of the first set of features which remain visible and a feature of the second set of features on the occluding object is substantially constant. "Substantially" constant means that the distance is constant within a predetermined margin of error. For example, with reference to FIG. 10, if the person's thumb is a feature of the occluding object, and the top of the water bottle is a visible feature of the physical object 1110, then the distance between the thumb and the top of the water bottle stays substantially constant as the hand and bottle move together. The distance might not be exactly constant, e.g. if the person adjusts their thumb a bit. The margin of error might be, for example, a centimeter in any direction or +/−10% variation in any direction. In some embodiments, the distance may be considered substantially constant if the feature on the occluding object and the visible feature on the physical object are each moving at substantially the same speed, e.g. at the same speed within a predetermined margin of error, such as +/−10%.

In some embodiments, the processor 404 may anchor the AR content to at least the occluding object responsive to determining that the occluding object is in contact with the physical object. For example, in FIG. 10, the processor 404 may have determined, e.g., by using computer vision or sensor data, that the user's hand has grabbed the physical object 1110, and thus anchored the AR content to both the physical object 1110 and the user's hand.

In some embodiments, the processor 404 may, responsive to the occluding object no longer occluding any of the detected first set of features, anchor the AR content again to only the physical object using the detected first set of features. For example, as discussed above, FIG. 10 shows virtual model 1210 anchored to both physical object 1110 and the occluding object, i.e., the user's hand. The user may move the physical object 1110 using their hand to a desired position and orientation, and then remove their hand such that it no longer occludes any of the detected first set of features of the physical object 1110, at which time the processor 404 may anchor the AR content again to only the physical object 1110.

Figure 5:
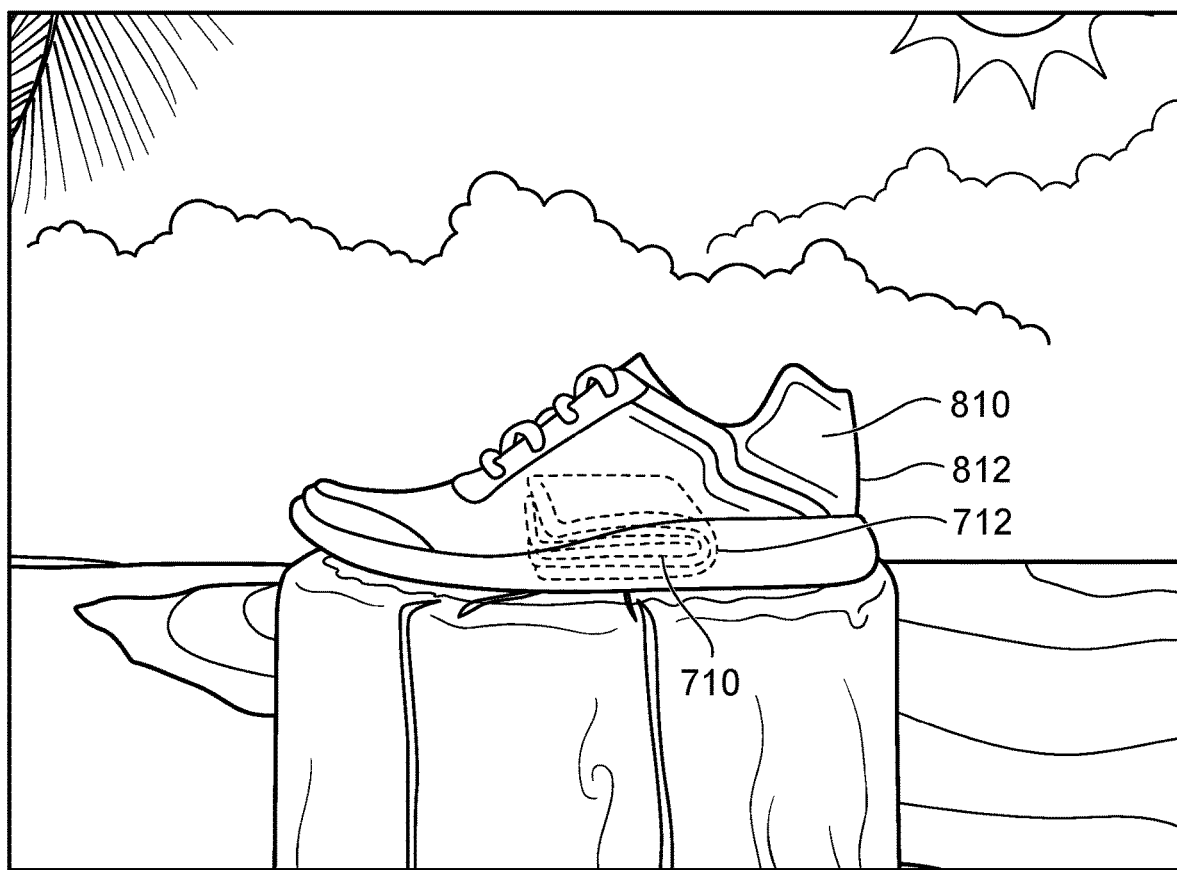
FIG. 5 illustrates the AR environment of FIG. 4, where AR content is overlaid onto and/or anchored to the object at a first position, according to some embodiments.

In some embodiments, the AR content may be anchored to the physical object at a first alignment wherein a boundary of the AR content closest to the occluding object is not aligned with a respective boundary of the physical object closest to the occluding object. For example, FIG. 5 shows the virtual object 810 anchored to the physical object 710 at a first alignment. An occluding object, such as a user's hand, may be detected by the processor 404 as approaching the physical object 710 from a particular direction, such as the right, like what is shown in FIG. 7. In response, the processor 404 may modify the anchoring of the virtual object 810 to the physical object 710 to a second alignment shown in FIG. 6, where the rightmost boundary 812 of the virtual object 810 closest to the user's hand is now aligned with the rightmost boundary 712 of the physical object 710. In this way, when the user's hand comes into contact with the physical object 710, it may appear on the user device that the user is interacting with the virtual model 810 as if the virtual model 810 were a physical object in the real-world space. At the same time, due to the modified alignment the user may additionally physically receive tactile feedback as though they are actually interacting with the virtual model 810. This may increase user enjoyment and satisfaction of the AR system. The modification by the processor 404 of the AR content from the first alignment to the second alignment may be discussed in the description as "automatic alignment modification".

In some embodiments, prior to anchoring the AR to the physical object the processor 404 may overlay the AR content over at least a portion of the physical object, maintain the AR content at a fixed position while the physical object moves, receive an input indicating that the AR content is to anchor to the physical object, and subsequently anchor the AR content to the physical object. For example, FIG. 5 may show the virtual object 810 overlaid over, but not yet anchored to, the physical object 710. The processor 404 may then maintain the virtual object 810 at a fixed position while the physical object 710 is moved to a position at which the alignment between the AR content and the physical object is one that is desired by the user (not shown). Once the desired alignment is achieved, AR system 400 may receive an input (e.g., user instructions) to anchor the AR content to the physical object at this new, desired alignment. This modification of alignment between the AR content and the physical object realized by movement of the physical object, may be discussed in the description as being "manual alignment modification".

In some embodiments, overlaying a virtual model onto a physical proxy object may include anchoring the virtual model to the proxy object. For example, overlaying a virtual model onto a proxy object may be defined as including a placement of the AR content over the proxy object at an initial alignment, and the anchoring of the virtual model to the proxy object at the alignment so that the virtual model tracks the movement of the detected first set of features on the physical object upon movement of the proxy object (whether the proxy object is physically moved within the real-world space or the user device is moved such that its view of the proxy object has changed, e.g., the user has rotated around the proxy object to a certain degree).

In some embodiments, overlaying the virtual model onto the physical object will occur separately (i.e., prior) to the anchoring. The overlaying of the virtual model onto the proxy object may include only the placement of the AR content over the proxy object at an initial alignment. Then, AR content may still be overlaid onto the physical object at a certain initial alignment, but not yet (releasably) fixed to the physical object.

To a user of the AR system 400, there may be no visual difference between AR content which is overlaid over a physical object and AR content which is anchored to a physical object. Therefore, FIGS. 5-7, and 9-11 may be used to illustrate embodiments where AR content is overlaid over a respective physical object, or anchored to it.

Figure 3:
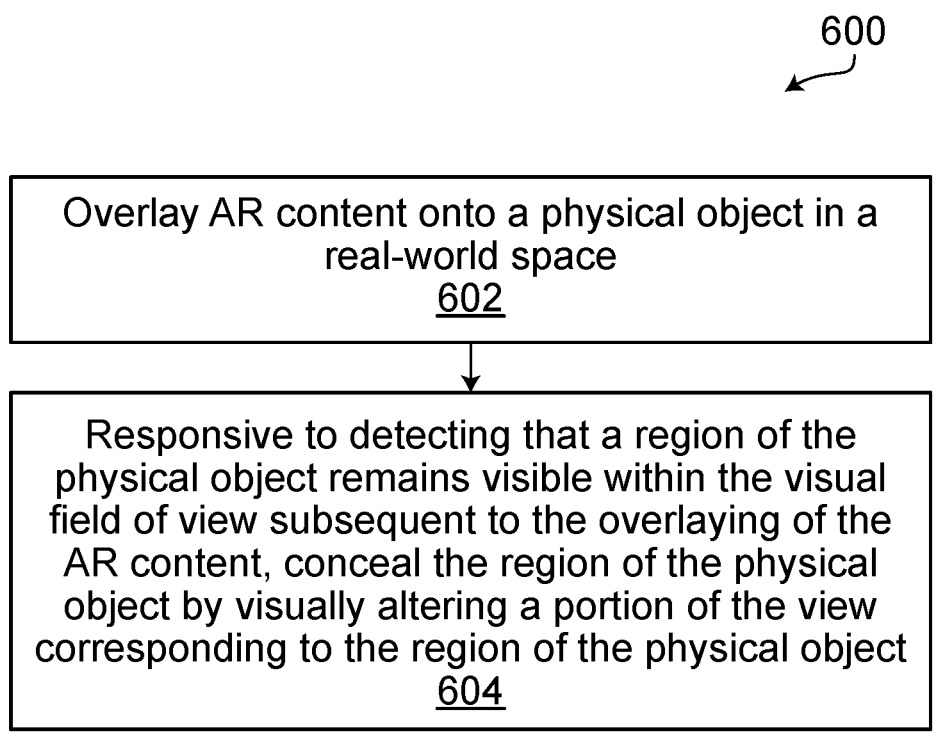
FIG. 3 illustrates another computer-implemented method, according to some embodiments.

FIG. 3 illustrates another computer-implemented method 600, according to some embodiments. The steps of method 600 are described as being performed by the processor 404 of AR engine 402 of FIG. 1, but this is only an example. At least a portion or all of the method 600 may instead be performed elsewhere, such as at the user device 430.

At step 602, processor 404 may overlay AR content onto a physical object in a real-world space within a visual field of view. For example, at FIG. 5, virtual object 810 is shown overlaid onto a physical object 710, and at FIG. 9, virtual object 1210 is shown overlaid onto a physical object 1110.

Figure 11:
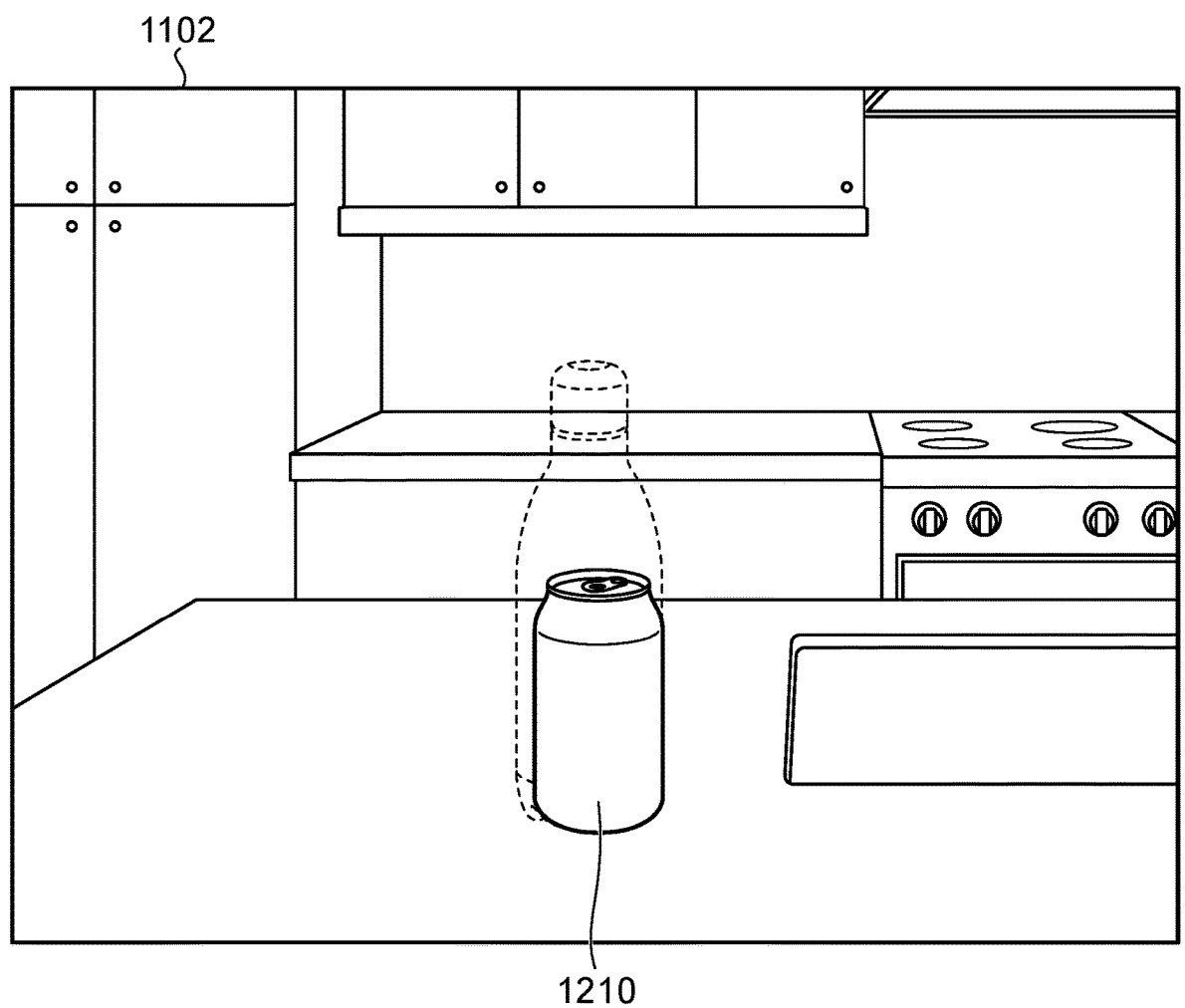
FIG. 11 illustrates the AR environment of FIG. 9, where a region of the object is concealed from view, according to some embodiments.

At step 604 of FIG. 3, subsequent to the overlaying of the AR content onto the physical object, processor 404 may, responsive to detecting that a region of the physical object remains visible within the visual field of view, conceal the region of the physical object within the visual field of view by visually altering a portion of the view corresponding to the region of the physical object. For example, in FIGS. 9-10, it is apparent that a region of the physical object 1110 remains visible within the visual field of view of the user device after the virtual model 1210 has been overlaid onto (and/or anchored to) the physical object 1110. FIG. 11 then illustrates an embodiment where processor 404 has subsequently concealed that region of the physical object 1110 within the visual field, so that from the perspective of the user device the physical object 1110 is no longer visible. In FIG. 11, stippled lines are used to show the region of the physical object 1110 that is no longer visible. The stippled lines are not visible to the user.

In some embodiments, visually altering the portion of the view corresponding to the region of the physical object may include visually altering at least some pixels (and possibly all pixels or substantially all pixels) corresponding to the region of the physical object. Visually altering the pixels may include altering a respective pixel value of each pixel of the at least some pixels based on an area of the real-world space within the visual field of view outside of the region of the physical object that is not covered by the AR content. For example, FIG. 11 shows an embodiment where processor 404 has visually altered the region of the physical object 1110 which remains visible after virtual model 1210 has been overlaid, such that the physical object 1110 has disappeared from the perspective of the user device.

In some embodiments, the processor 404 may further detect a set of features on the physical object within the visual field of view, and anchor the AR content to the physical object using at least one of the detected set of features. For example, as shown in FIG. 9, processor 404 may detect a set of features on the physical object 1110, such as axes, edges, boundaries, shape, or points. The processor 404 may then anchor the virtual object 1210 to the physical object 1110 using one or more of the detected set of features.

In some embodiments, the processor 404 may detect that the region of the physical object remains visible by detecting that a subset of the set of features of the physical object is not overlaid with AR content. For example, the set of features detected by processor 404 with respect to the physical object 1110 shown at FIGS. 8-11 may include a top edge or boundary 1111, a rightmost edge or boundary 1112, a leftmost edge or boundary 1114, a curvature 1116 or a point along the curvature, etc. Subsequent to overlaying the virtual object 1210 onto the physical object 1110, processor 404 may detect that a subset of the features of the physical object 1110, namely features 1111, 1114, and 1116, are not overlaid with the virtual object 1210.

In some embodiments, anchoring the AR content to the physical object may include aligning the AR content with the physical object, and maintaining the aligning during movement of the physical object so that the region of the physical object which remains visible remains substantially the same during the movement. "Substantially" the same means that the visible region remains the same within a predetermined margin of error, e.g. +/−3%. That is, the visible region remains the same but not necessarily exactly the same, e.g. the visible region may slightly change due to limitations in rendering during movement or a changed orientation. Aligning the AR content may involve the processor 404 rendering the AR content with an element of the AR content aligned with a respective element of the physical object.

In some embodiments, the aligning step includes the element of the AR content being aligned with the respective element of the physical object such that the region of the physical object which remains visible is a single continuous region. This provides a technical benefit in that only one region of the physical object needs to be visually concealed, rather than multiple separate regions. For example, FIG. 9 illustrates an embodiment where processor 404 renders virtual model 1210 at an alignment where the rightmost edge 1214 of the virtual model 1210 aligns with the rightmost edge of the physical object 1110, and a bottom edge of the virtual model 1210 aligns with the bottom edge of the physical model 1110. The alignment is one that results in the visible region of the object 1110 being one single continuous region.

In some embodiments, aligning the AR content with the physical object includes determining a plurality of possible alignments, and selecting one of the alignments for the aligning. Each of the possible alignments may include an element of the AR content aligned with an element of the physical object, and the selected alignment may be one that has a single continuous region as the region of the physical object which remains visible. For example, in FIG. 9, the processor 404 may determine a plurality of possible alignments between virtual model 1210 and physical object 1110. The alignment shown in FIG. 9 may then be chosen by processor 404 as it is one that has a single continuous region as the region of the physical object which remains visible to the user device.

In some embodiments, processor 404 may, responsive to detecting that a portion of the region of the physical object which remains visible within the visual field of view has become occluded within the visual field of view, no longer conceal the portion that has become occluded. For example, FIG. 11 shows an embodiment where the visible region of the physical object has been concealed from the user device. If subsequently, an occluding object such as a user's hand or additional AR content was to occlude a portion of this visible region, it may be undesirable for the processor 404 to continue to conceal that portion, since it would appear as though at least a part of the hand or additional AR content keeps disappearing, which may create a jarring experience and decrease user enjoyment of the AR system. Therefore, in such scenarios processor 404 may no longer conceal the portion so that the occluding object can remain fully seen, as desired by the user.

The AR system of the present application will now be discussed in more detail with reference mainly to FIGS. 4-11.

As discussed above, an AR system may display AR content on a user device, the AR content overlaid onto a physical object in a real-world space surrounding the user device. In some embodiments, user device 430 may be a device such as a mobile phone, tablet or AR headsets where a view of the real-world space surrounding the user device is captured by a sensor and displayed to the user. For example, in the embodiment illustrated in FIG. 7, user device 430 may be a mobile phone or tablet with display 436 and a rear-facing camera (not shown) which captures images of a real-world space for display on display 436. In some embodiments, user device 430 may be AR glasses, or other equipment, and the display 436 may include transparent or near-transparent lenses which allow the user to view the actual real-world space surrounding the user device.

FIG. 4 illustrates an AR environment 702 as viewed by a user device 430, the AR environment based on a real-world space 704 surrounding the user device. The real-world space 704 is a location at which a user of the AR system 400 wishes to implement the AR engine 402. For example, the user may be a photographer hired to take photos of a particular product in an appealing way and may view the real-world space 704 as an attractive backdrop for the product shoot. The user may then obtain a real-world physical object 710, which in this case is a wallet 710, and place the wallet 710 at a desired location, e.g., on a surface 706 found in the real-world space 704. The physical object 710 may be any physical object existing in the real-world space. In a preferred embodiment, the physical object 710 may be one that is able to be moved by the user. The AR system 400 may then be used to overlay and/or anchor AR content onto physical object 710.

In order to anchor AR content to the wallet 710, it may need to first be recognized by the AR system 400 as the physical object onto which AR content must be overlaid. In some embodiments, instructions from the user may be processed by the AR system 400 (e.g., by processor 404) to select the appropriate physical object on which to overlay AR content. For example, in embodiments where user device 430 is a mobile phone or tablet, the user may interact with a touch screen on display 436 to tap or otherwise select wallet 710 on the touch screen, with the wallet 710 being detected as the object onto which AR content will be overlaid using raycasting, for example. Alternatively or additionally, user instructions may involve a physical interaction with the object (such as grabbing the wallet 710 in the real-world space), a hand gesture detectable by the AR system 400 (such as pointing to, near or "on" the wallet 710), a voice command, eye-initiated command (e.g., for an AR system which can track a user's eye movements), neural command, etc. In some embodiments, a combination of these may be used. For example, the user may physically grab wallet 710 and speak a voice command such as, "Portray this as [a desired virtual model]" to overlay the wallet 710 with the desired virtual model.

AR system 400 may recognize hand gestures implementing OpenCV Python, MediaPipe, or other open-source software frameworks. AR system 400 may include a microphone (e.g., at user device 430) to capture a voice command, and include or have access to a voice recognition software using neural networks to process and understand the command. AR system 400 may track eye movements by using a sensor such as a camera to record the user's eye positions and use known computer vision algorithms and image processing to map the camera feed to coordinates in the real-world space to recognize at which object the user is currently looking. Any of these user sensory signals such as eye-tracking, voice command, neural network, etc. can be combined to determine which object will be selected as the physical object.

Once a physical object such as wallet 710 is recognized or selected as the object onto which AR content desired by the user will be overlaid, AR system 400 may detect a set of features on the physical object, which set of features will be used to overlay the AR content onto the physical object. As discussed above, features may include a discrete point (e.g., a corner point, an intersecting point), an axis (e.g., a central axis, a horizontal axis, vertical axis), a plane, a surface, a shape (e.g., a curved boundary of the object), or any other detectable element of the physical object. For example, based on the user device's view of the wallet 710 in FIG. 4, the set of features for the wallet 710 detected by the AR system 400 may initially include a top surface 711, a rightmost boundary 712, a bottom boundary 713, a leftmost boundary 714, corner points including a upper-right corner point 715. AR system 400 may detect features on the physical object by using, for example, computer vision algorithms, and/or machine learning algorithms, and/or object detection algorithms, and/or data from sensors such as a camera, or lidar, radar, sonar sensors.

In some embodiments, the user may be prompted, for example by a message that pops up on display 436 of user device 430, to show the physical object to the AR system 400 at various angles and orientations. The system 400 may detect features of the physical object as it is rotated through the various angles and orientations, such that the set of features detected by the system 400 may include features of these newly detected features of the physical object, in addition to the initially detected features (e.g., features 711, 712, 713, 714, 715 of wallet 710). In this way, if the physical object is moved in such a way that from the perspective of the user device one or more of the initially detected features are no longer visible, e.g., the physical object has been rotated), AR system 400 may maintain its recognition of the physical object and keep AR content anchored to the physical object. Furthermore, system 400 may know the specific position and orientation at which the virtual model should be displayed (since the anchored AR content must track the physical object and thus must be displayed as having been being moved in exactly the same way as the physical object). This process of detecting features of a physical object from various angles and orientations may be described as "registering" the physical object into the AR system 400. The AR system 400 may retain information gathered from this process in memory 406 so that if the user used the same physical object at a subsequent time, the AR system would not need the physical object to be registered again.

In some embodiments, AR system 400 may, for example by using a sophisticated enough computer vision model, look at one view of a physical object (e.g., the view of wallet 710 as shown in FIGS. 5-7) and estimate the pose of the physical object at different angles and orientations.

In some embodiments, instead of using an arbitrary object in the real-world space (such as an object that happened to exist in the real-world space where the AR system is used, or the user's belonging, like a wallet) as the physical object, the user may have with them one or more pre-registered objects, i.e., objects for which the AR system 400 has previously detected the respective set of feature points. For example, there may be physical blocks with known sizes and features, and the AR system 400 may recognize which block the user wishes to use as the physical object (e.g., because the user is holding it or because the block is the only registered block that is visible to system 400). Pre-registered physical objects may allow the user to skip the registering process. Further, pre-registered objects may be manufactured to have certain dimensions, shapes, mass, or other characteristics that are associated with certain virtual models. In such cases, using a pre-registered physical object sized and shaped similarly to the desired AR content may result in higher user immersion and enjoyment of the AR system 400, as the tactile feedback may feel more realistic to the user.

In general, even if an arbitrary object from the real-world space surrounding a user device is used as the physical proxy object, the user may intuitively choose, or be encouraged to choose by the AR system 400, an object having one or more characteristics which resembles the desired virtual model in some way. These one or more characteristics may have to do with physical attributes (e.g., size, and/or shape, and/or mass, and/or feel, etc.), or they can be positional (e.g., if the desired virtual model is a clock and the user wishes for it to be displayed in the AR environment as attached to a vertical wall, the user may choose or be encouraged to choose a rectangular painting on the wall, despite there being a circular object on the ground). For example, system 400 may cause a message such as "Your AR experience can be improved if your proxy object matches your desired AR object, whether in size, shape, weight, or feel!" to be displayed on display 436.

In some embodiments, alternative or in addition to encouraging the user to choose a proxy object with certain characteristics similar to the virtual object to be placed in the AR environment, the AR system 400 may scan the real-world space surrounding the user and provide the user with one or more real-world objects in the space as possible physical objects to which AR content can be overlaid and anchored. Each of the possible physical objects may have one or more characteristics that are similar to the desired AR object. The possible physical objects may be determined by the AR system 400 to have the one or more characteristics by, for example, using computer vision algorithms, and/or machine learning algorithms, and/or object detection algorithms, and/or data from sensors such as a camera and lidar, radar, sonar sensors.

In some embodiments, AR system 400 may provide feedback (e.g., via audio feedback, haptic feedback, text displayed on user device 430) about a user-selected physical proxy object, such as confirming that the selected proxy object seems to be a good proxy object, warning the user that the selected object may not be a good proxy object, or rejecting the selected proxy object and/or encouraging the user to select a different object as the proxy object. The feedback to be given to the user may be determined using, for example, using computer vision algorithms, and/or machine learning algorithms, and/or object detection algorithms, and/or data from sensors such as a camera, or lidar, radar, sonar sensors.

FIG. 5 illustrates an embodiment where AR content in the form of a virtual 3D object 810 has been overlaid onto physical object 710 using the set of features on object 710 detected by AR system 400. In this implementation, virtual object 810 is a 3D virtual model of a shoe.

As discussed briefly above, AR shoe 810 may be stored in 3D model record 410 of memory 406 of AR engine 402. The virtual models stored in the 3D model record 410 may be obtained in various ways.

In some embodiments, the user may be a merchant of products (or be associated with a merchant) who has built their own 3D models of one or more products they sell, and have provided these 3D models to the model record 410. For instance, in the embodiments shown in FIGS. 6-7, AR object 810 may be a 3D virtual model built by a merchant who sells the shoe, and the user of AR system 400 may be a product photographer assigned to photograph the product. In such embodiments, at any time a user wishes to use AR system 400, they may have one or more specific virtual models already available to be overlaid in the AR environment.

In some embodiments, the model record 410 may include models from online virtual model databases, or the AR engine 402 may have access to such online virtual model databases, and the virtual model selected to be presented in the AR environment may be selected from a database. An example of an online virtual model database platform is Sketchfab®. The user may be able to browse the databases to manually select the virtual model, or processor 404 may, based on user instructions, search for and select an appropriate virtual model to be implemented in the AR environment. If the virtual model is selected by processor 404 based on user instructions, the selected virtual model may be selected for various reasons. For example, it may be the most common or standard type of the virtual model, or the one most commonly selected by the user or other users. As another example, the processor 404 may select a virtual model based on certain characteristics or features of the physical object to which the virtual model will be overlaid, or the user's instructions for the virtual model.

In some embodiments, the AR engine 402 may include or have access to a 3D generative model that is capable, for example by using machine learning, of creating virtual models based on instructions from a user. For example, the AR engine may receive instructions from the user to create a virtual model for placement in the AR environment. Alternatively or additionally, the generative model may be used to modify or replace a selected or created virtual model based on instructions from the user. For example, the user may request, e.g., using gestures, voice commands, touchscreen inputs, etc., that a specific characteristic such as type, color, model, etc., of the virtual model be modified.

The dimensions and size of the virtual model when first overlaid onto the physical model, may be such that the virtual model corresponds to approximately the size of the physical object (without subjecting the virtual model to distortion, for example), or at least within the order of magnitude of the physical object. This may result in minimization of the region of a physical object which remains visible after the overlaying of the AR content onto the physical object, and thus may be computationally beneficial for the AR system 400.

In some instances, this default sizing may be overridden. For example, there may be situations where it is important that the virtual model is portrayed to the user with dimensions that are accurate to a real-life object represented by the virtual model, such as in the embodiments illustrated in FIGS. 4-7 where a merchant may wish for the virtual model 810 to be scaled to the real-life version of it so that all product photography obtained using the virtual model 810 would be dimensionally accurate with respect to the real-world space around it. For this type of implementation, the dimensions of the real-life version of the virtual model may be provided to the AR system 400, or the system 400 may determine the dimensions by using, for example, image processing. Then when overlaying the virtual model, the system 400 may scale the virtual model based on where in the real-world space it is supposed to be positioned.

Another instance where the default sizing may be overridden is in a situation where the user wishes to make the virtual model bigger or smaller. AR system 400 may recognize user instructions (e.g. user sensory signals), or other commands such as gestures or inputs on a touch screen (e.g. a pinching motion), to achieve making the virtual model bigger or smaller for the user's benefit.

A further instance where the default sizing may be overridden is where more than one physical object are each a proxy object for a respective virtual model. For example, it may be desirable to a user in such cases for the virtual objects that are rendered to be in the same order of scale regardless of the sizes of the proxy objects over which they are overlaid. To be rendered in the same order of scale, AR system 400 may average the scale between two proxy objects, or alter the scale of one or more of the proxy objects to match one or more of the other proxy objects.

The initial alignment between the virtual model with the proxy object may be determined by the AR system 400 by following a rigid set of rules, or heuristically depending on characteristics or features of the proxy object and/or virtual model, or a combination of both.

For example, in some embodiments, it may be that a central axis (such as a central vertical axis) of the proxy object is always first determined by the AR system 400, and the initial alignment includes the central axis of the virtual model aligned with the respective central axis of the virtual model. If the physical object is determined to be positioned on top of a surface (as shown in FIG. 4 where wallet 710 sits on surface 706), the initial alignment may further or alternatively include the bottom boundary of the virtual object aligned with the bottom boundary of the proxy object so that the virtual model does not appear to be floating. For instance, FIG. 5 shows the central vertical axis of the wallet 710 and the central vertical axis of the virtual model 810, and the bottom boundary of the virtual model and the bottom boundary 713 of the proxy object, as being aligned. The process followed by the AR system 400 to determine the initial alignment may continue on, e.g., by considering other boundaries, surfaces, edges, corners, shapes, texture, etc., until an initial alignment is determined.

In some embodiments, the AR system 400 may first analyze the bounding box (an imaginary rectangle surrounding an object which may denote the dimensions, axes, class/type, position, etc. of the object) of each of the virtual and proxy objects. Additionally, the AR system 400 may analyze the characteristics/features of the objects. Based on the analysis, AR system 400 may determine which elements of the virtual and proxy objects should be aligned in the initial alignment, as opposed to following a set process. For example, AR system 400 may determine that the rightmost boundary 712 of physical object 710 may be quite similar in shape to a bottom right portion of the virtual object 810, and therefore determine that the initial alignment should include these elements aligned, like the alignment shown in FIG. 6. This initial alignment (and any subsequent alignments) may be modified, as explained later.

FIG. 7 shows an embodiment where an occluding object, in this case the user's hand, occludes one or more features of the detected set of features of the physical object to which AR object 810 is anchored. As shown in FIG. 7, the user's hand covers features 715 and some of feature 711 of the physical object. The user may occlude some of the wallet 710 with their hand in an attempt to move the wallet 710 and thereby cause the anchored AR object 810 to move accordingly. For example, in the scenario where the user is a product photographer, the user may wish to rotate the angle of the AR object 810 (e.g., "into" or "out of" the page from the angle it is shown in FIGS. 6-7) to obtain a photo of the AR object 810 at a different angle.

When one or more features on the proxy object are occluded by the occluding object, the AR system 400 may detect a set of features on the occluding object. For example, in FIG. 7, the AR system may detect a set of features on the user's hand, which features may include top, bottom, rightmost, and leftmost boundaries, curvatures in the hand, centroid of the hand, etc. The set of features may include just one feature, e.g., the centroid of the hand. Then, the AR system may anchor the AR content to the occluding object, i.e., remove the anchor from the proxy object, or to both the proxy object and the occluding object, i.e., maintain the anchoring of the virtual model on the proxy object and anchor the virtual model also to the occluding object. Whether the AR system 400 anchors the virtual model to only the occluding object or to both the proxy object and the occluding object may depend on how many of the set of features of the proxy object the occluding object occludes from the user device 430.

In some embodiments, the occluding object may occlude all of, most of, or above a threshold number or percentage of, the detected set of features of the physical proxy object. In such a scenario, it may be difficult or impossible for the AR system 400 to observe any subsequent movement of the proxy object in a meaningful way as to anchor the AR content onto it so that the AR content tracks the movement. Therefore, in such cases there may be a transition of the anchoring, or reanchoring, of the AR content from the proxy object to the occluding object. The reanchoring of the AR content may not be noticeable by the user, i.e., there may be no glitch or sudden "jump" of the AR content from one position to another in the AR environment. For example, AR system 400 may recall the position and orientation of the AR content at the time of occlusion, and when anchoring to the occluding object, keep that position and orientation for the AR content. In other words, it may be as if the occluding object is a replacement for the proxy object it occludes (e.g., object 710), not a new proxy object. Therefore, although the AR content will now track movement of the occluding object, e.g., if the user rotates their hand, the AR content may rotate by the same amount, there may not be any meaningful alignment between the AR content and the occluding object, e.g., there may be no respective elements of the AR content and the occluding object aligned, and there is no need for the AR system 400 to determine any such meaningful alignment. If the number or percentage of the occluded features of the physical proxy object return to below the threshold, AR system 400 may transition the anchoring of the AR content back to the proxy object (i.e., restore the anchoring to the AR content), or may anchor the AR content to both the proxy object and the occluding object depending on the number of features of the physical proxy object that become unoccluded. Alternatively, the number or percentage of the occluded features may remain above the threshold for the remainder of the user's use of AR system 400, in which case the AR content will remain reanchored to the occluding object.

In some embodiments, the occluding object may not cover all of, most of, or above a threshold number or percentage of, the detected set of features of the physical proxy object. For example, in the embodiment illustrated in FIG. 7, assuming that features 711, 712, 713, 714, 715 made up the entire set of features, the user's hand is shown as covering only features 715 and a part of feature 711. It may be possible to observe subsequent movement of the features of the proxy object that remain visible and keep the AR content anchored using those features, however the AR system may have difficulty anchoring the AR content to the proxy object in a defect-free way (e.g., without glitching or jumping of the AR content). In such cases there may be a transition of the anchoring of the AR content from only the proxy object to both the proxy object and the occluding object, in order to minimize the chances that the AR content is displayed with flaws. Similar to the reanchoring of AR content to only the occluding object, there may be no noticeable effect to the user of the anchor transition.

In some embodiments, anchoring the AR content to both the proxy object and occluding object, may only be performed by the AR system 400 upon the system 400 determining that the proxy and occluding objects are moving together. For example, in some embodiments, an occluding object may occlude one or more of the set of features of the proxy object, e.g., because the user has moved the user device to a position where a stationary object now occludes a portion of the physical object from the user device, or the occluding object is a person or object which moves past the user device, in between the user device and the proxy object. In such situations, the features of the detected set of features of the proxy object which remain visible, i.e., the one or more of the detected first set of features not occluded by the occluding object, and the detected set of features of the occluding object may be determined by the processor 404 as not moving together. Therefore, the AR content may remain anchored to only the physical object based on the features of the physical object which remain visible, as opposed to both the physical object and the occluding object.

In some embodiments, determining that the features of the detected first set of features which remain visible and the detected second set of features on the occluding object are moving together may involve the AR system 400 detecting that a distance between a feature of the set of features on the proxy object which remain visible and a feature of the set of features on the occluding object, is substantially constant. This may be done, for example, by using computer vision algorithms, and/or machine learning algorithms, and/or object detection algorithms, and/or data from sensors such as a camera. For example, when the user device 430 is a mobile phone or tablet, images of the real-world space surrounding the user device may be captured and image processing techniques may be used to determine whether a particular feature of the set of features on the proxy object which remain visible and a particular feature of the set of features on the occluding object, is substantially constant.

In some embodiments, determining that the features of the detected first set of features which remain visible and the detected second set of features on the occluding object are moving together may involve the AR system 400 using, for example computer vision algorithms, object detection algorithms, image processing techniques, sensor data, etc., to continually (e.g., from the time when the AR content is first overlaid) detect and monitor every object that is within the visual field of view, or at least every object that is closer to the proxy object than a threshold distance. AR system 400 may detect a set of features for each of the detected objects. If any of the detected set of features of the proxy object subsequently becomes occluded, and any of the set of features of a monitored object is determined by the system 400 to be moving at the same speed as any of the unoccluded features of the proxy object, the system 400 may deem the monitored object to be the occluding object and may deem that the proxy object and the monitored object are moving together and the AR content may thus be anchored to both the proxy object and the monitored object. Subsequently, if the AR system 400 determines that the features of the monitored object continue to move but the unoccluded features of the proxy object do not, the system 400 may disregard the monitored object and restore the anchor of the AR content on the proxy object.

In some embodiments, anchoring the AR content to only the occluding object, or to both the proxy object and occluding object, may only be performed by the AR system 400 upon the system 400 determining that the occluding object is in contact with the physical object. For example, FIG. 7 illustrates the user's hand grabbing the physical object 710 and therefore in contact with the physical object. In contrast, in embodiments where the occluding object is not in contact with the proxy object, e.g., when an occluding object is one that is stationary but occludes a portion of the proxy object because it is positioned between the proxy object and the user device, the AR system 400 may maintain the anchoring of the AR content to the proxy object using the features of the set of features of the proxy object that remain visible to the AR system 400. The determination by the AR system 400 as to whether an occluding object is in contact with the proxy object may be performed using radar measurements or computer vision algorithms, for example.

In some embodiments, anchoring the AR content to only the occluding object, or to both the proxy object and occluding object, may only be performed by the AR system 400 upon the system 400 not only determining that the occluding object is in contact with the physical object, but that the occluding object is interacting with the physical object, e.g., a user's hand grabbing the physical object, as opposed to pointing to the physical object and inadvertently touching it. AR system 400 may, e.g., by using computer vision algorithms and/or machine learning algorithms, intelligently distinguish between whether an occluding object will interact with the proxy object or not. Alternatively, the AR system 400 may include different "modes", e.g., an edit or grab mode or a display mode, and the system 400 may interpret certain movements, gestures, of the occluding object differently depending on whether the system is implementing the edit/grab mode or the display mode.

In some embodiments, it may be desirable to modify the alignment between the virtual model and the physical object. The modification of the initial alignment (or modification of a subsequent alignment to a further subsequent alignment) may occur in various ways.

In some embodiments, the AR system 400 may implement automatic alignment modification. In such cases, the initial alignment may include a boundary of the virtual object closest to an occluding object not being aligned with a boundary of the proxy object closest to the occluding object. For example, in FIG. 5, the rightmost boundary 812 of virtual model 810 is shown as not aligned with the rightmost boundary 712 of the physical object. If in the AR environment an occluding object, such as a user's hand, approached the virtual model 810 and physical object 710 from the right side, without a change in alignment, visually simulated contact between a user's hand and the AR content would occur first before the user receives any tactile feedback. Further, the user may see their hand disappearing behind AR object 810. These may decrease user immersion of the AR experience. Therefore, in such scenarios, the processor 404 may detect that the occluding object is approaching the physical object from a particular direction, and subsequently modify the anchoring of the AR content to the physical object to an alignment wherein the boundary of the AR content closest to the occluding object is aligned with a respective boundary of the physical object closest to the occluding object. For example, the alignment between the AR object 810 and physical object 710 shown at FIG. 5 may be modified to the alignment shown at FIG. 6. Then, when the user's hand eventually comes into visually simulated contact with the AR object 810, the user will receive tactile feedback in interacting with the physical object 710, and there may be no disappearance of the whole hand behind the AR object.

In some embodiments, the AR system may implement manual alignment modification. In such implementations, prior to anchoring the AR to the physical object the processor 404 may overlay the AR content over at least a portion of the physical object, maintain the AR content at a fixed position while the physical object moves, receive an input indicating that the AR content is to anchor to the physical object, and subsequently anchor the AR content to the physical object. The processor 404 may then maintain the AR content at a fixed position while the physical object is moved, e.g., by a user's hand or other object, to a position at which the alignment between the AR content and the physical object is one that is desired by the user. Once the desired alignment is achieved, AR system 400 may receive an input (e.g., user instructions) to anchor the AR content to the physical object at this new, desired alignment.

In embodiments where AR content is anchored and fixed to a physical object, the AR system 400 may release the anchor, effectively decoupling the virtual model and the proxy object, such that the manual alignment modification can be realized.

In some embodiments, during the implementation of manual alignment modification, the user may receive visual cues that manual alignment modification is occurring. For example, the AR system 400 normally presents AR content as opaque. However, during manual alignment modification, the AR system 400 may render the AR content in a translucent manner so that even in an embodiment where the AR content covers the whole of the physical object (like shown in FIG. 5), both of the AR content and the physical object can be seen within the AR environment. This may allow the user to more easily move (or otherwise instruct, e.g., by using voice command) the proxy object until the desired alignment is reached. The rendering of the AR content in the translucent manner may also indicate to the user that the AR system 400 is maintaining the position of the AR content (i.e., the system 400 has "frozen" the AR content in place) and the physical object can be freely moved without causing the AR content to move also. Once the desired alignment is reached, the AR content may be rendered once again in an opaque manner.

In some embodiments, the initial alignment between the AR content and the proxy object may be rudimentary. For example, instead of going through a rigid or heuristic process with a set of rules to follow to determine an optimal initial alignment as outline above, AR system 400 may instead overlay the AR content at an arbitrary or using a less computer-intensive process, e.g., aligning the approximate centroid of AR content model with the approximate centroid of the proxy object. In such implementations, after the initial alignment, manual alignment modification may be prompted by the AR system 400 to allow the user to move the proxy object until a desired alignment is reached.

FIG. 8 illustrates an AR environment 1102 as viewed by a user device 430, the AR environment based on a real-world space 1104 surrounding the user device. The real-world space 704 is a location at which a user of the AR system 400 wishes to implement the AR engine 402. The user may then obtain a real-world physical object 1110, which in this case is a bottle 1110, and place the bottle 1110 at a desired location, e.g., on a surface 1106 found in the real-world space, which in this case is a kitchen counter 1106. The physical object 1110 may be any physical object existing in the real-world space. In a preferred embodiment, the physical object 1110 may be one that is able to be moved by the user.

The bottle 1110 may be recognized, detected, or chosen by the AR system 400 as being the object to which AR content is to be overlaid, in a manner similar to what is described above in reference to physical object 710. The AR system 400 may then overlay and/or anchor AR content, such as a virtual can 1210, onto physical object 1110. The processes described above with respect to registering a physical object, detecting features on the physical object (and an occluding object), anchoring, aligning, modification of alignment and so on, with respect to FIGS. 4-7 may apply to FIG. 8-11 as well. For example, the detected set of features of the bottle 1110 may include a top boundary 1111, rightmost boundary 1112, leftmost boundary 1114, and curvature 1116.

FIG. 9 shows an embodiment where AR system 400 has overlaid virtual model 1210 onto bottle 1110. As shown, a region of the bottle 1110 remains visible within the visual field of the user device after the overlaying of the virtual model 1210. This region of the bottle 1110 covers a portion of the real-world space 1102 (the "hidden portion" of the real-world space). In response, AR system 400 may conceal the region of the bottle 1110 which remains visible (the "visible region" of the physical object) within the visual field of view by visually altering a portion of the view, the portion corresponding to the visible region.

In some embodiments, visually altering the portion of the view corresponding to the visible region of the physical object may include the AR system 400 visually altering some, most, or all pixels corresponding to the visible region. Visually altering the pixels may include the AR system 400 altering a respective pixel value of each pixel of at least some of the pixels based on an area of the real-world space within the visual field of view outside of the visible region. In other words, at least some of the pixels corresponding to the visible region may be altered in color and/or intensity to resemble the hidden portion of the real-world space, and effectively conceal the visible region from the user within the AR environment.

In some embodiments, this concealment may be achieved, for example, by using techniques such as image inpainting.

Some image inpainting processes may involve a fast marching method. This method starts filling in the image starting from the boundary of the region to be replaced (e.g., the visible region of the physical object) and moves towards the center of the region. Each pixel in the region is replaced or "inpainted" by a normalized weighted sum of all of the known pixels in its vicinity. Once a pixel is inpainted, the boundary is updated, and this process is repeated until all of the pixels in the region have been inpainted.

Some image inpainting processes may involve the Navier-Stokes method, which incorporates concepts from fluid mechanics and partial differential equations. The method may involve "following" edges from the known portion (e.g., the real-world space within the visual field of view except for the hidden portion) to the unknown portion (e.g., the visible region of the physical object) using the presumption that edges are continuous and therefore should be preserved, and propagating color information in smooth regions (e.g., by obtaining color information for a pixel from its surrounding area).

Software frameworks such as OpenCV may be used to implement image inpainting processes such as those involving the fast marching method or the Navier-Stokes method.

Specifically, in some embodiments the AR system can include or use a machine learning model which has been trained using image samples, to perform the image inpainting. To train, images that have been altered to have one or more missing patches are fed to the model, and the model's output is compared with the unaltered images (ground truth images) to update the model. In use, the model may be fed with an input image with one or more patches that need to be filled in to make the image whole. The model may also be provided with a layer mask which contains information for the missing patches (e.g. a binary layer mask with the same size as the input image with 1 for pixels which are missing in the input image and 0 for all other pixels). The model may generate a synthetic image, and the layer mask may allow the model to discard from the synthetic image, portions that did not need to be inpainted in the input image. The synthetic image may be then superimposed on the input image to yield an output completed image.

In some embodiments, an alternative method to conceal the visible region of the physical object may be implemented by system 400. In such implementations, one or more images of the real-world space without the physical object covering the hidden portion of the real-world space may be used. For example, a sensor such as a rear-facing camera located on user device 430 may capture images of the real-world space, and one or more of these images may show the hidden portion of the real world space, e.g., because the user or the physical object was at a different position. Then, the AR system 400 may conceal the visible region of the physical proxy object by replacing at least the visible region with an image captured previously, the image having the hidden portion of the real-world space.

For example, FIG. 11 shows an embodiment where processor 404 has visually altered the region of the physical proxy object 1110 which remains visible after virtual model 1210 has been overlaid, such that the proxy object 1110 has disappeared from the perspective of the user device. This may be achieved using image in-painting, or by using previously captured images of the real-world space, as described above.

In other embodiments, the pixels of the visible region may also or instead be modified based on the AR content, e.g. to look like or be an extension of the virtual model, or to act as a transition between the virtual model and the surrounding scene.

In some embodiments, anchoring AR content to a physical object may include the AR system 400 aligning the AR content with the physical object by rendering the AR content with an element of the AR content aligned with a respective element of the physical object such that the region of the physical object which remains visible within the visual field of view (and thus requires concealment) is a single continuous region. For example, FIG. 9 illustrates an embodiment where processor 404 renders virtual model 1210 such that the rightmost edge 1214 of the virtual model 1210 aligns with the rightmost edge of the proxy object 1110, and a bottom edge of the virtual model 1210 aligns with the bottom edge of the proxy model 1110. As shown, the processor 404 may select the element which results in the visible region proxy object 1110 being a single continuous region. Due to the dimension difference between virtual model 1210 and proxy object 1110 as shown in FIGS. 8-11, most possible alignments between them may result in a single continuous region. However, a scenario can be envisioned where if the alignment is not chosen with the goal of creating a visible region that is a single continuous region, multiple visible regions can easily be created, e.g., where the proxy object is longer in a horizontal axis than the virtual model, and the virtual model is longer in a vertical axis than the proxy object. In such a case, if the central vertical axes of the proxy object and virtual model were aligned, there may be two distinct visible regions of the proxy object, the concealing of which may be more computationally intensive and/or difficult for the AR system 400.

In some embodiments, anchoring the AR content further includes the AR system 400 maintaining the aligning during movement of the physical object so that the region of the physical object which remains visible within the visual field of view remains substantially the same during the movement. For example, FIG. 10 illustrates an embodiment where the alignment between the virtual can 1210 and bottle 1110 is maintained even as the bottle 1110 is in a state of movement within the real-world space, so that the visible region remains substantially the same.

In some embodiments, aligning the AR content with the physical object includes determining a plurality of possible alignments between the AR content and the physical object, and selecting one of the plurality of possible alignments for the aligning. Each of the plurality of possible alignments may include one element of the AR content aligned with a respective one element of the physical object, and the selected alignment may be one that has a single continuous region as the region of the physical object which remains visible In some embodiments, AR system 400 may, responsive to detecting that a portion of the visible region has become occluded within the visual field of view, no longer conceal the portion that has become occluded. The visible region may become occluded, for example, by an occluding object or by additional AR content. For example, FIG. 11 shows an embodiment where the visible region of the physical object has been concealed from the user device. If subsequently, an occluding object such as a user's hand or additional AR content was to occlude a portion of this visible region, it may be undesirable for the AR system 400 to continue to conceal that portion, since it would appear as though at least a part of the hand or additional AR content keeps disappearing into thin air. Therefore, in such scenarios the AR system 400 may no longer conceal the portion so that the occluding object can remain fully seen, as desired by the user.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 12:
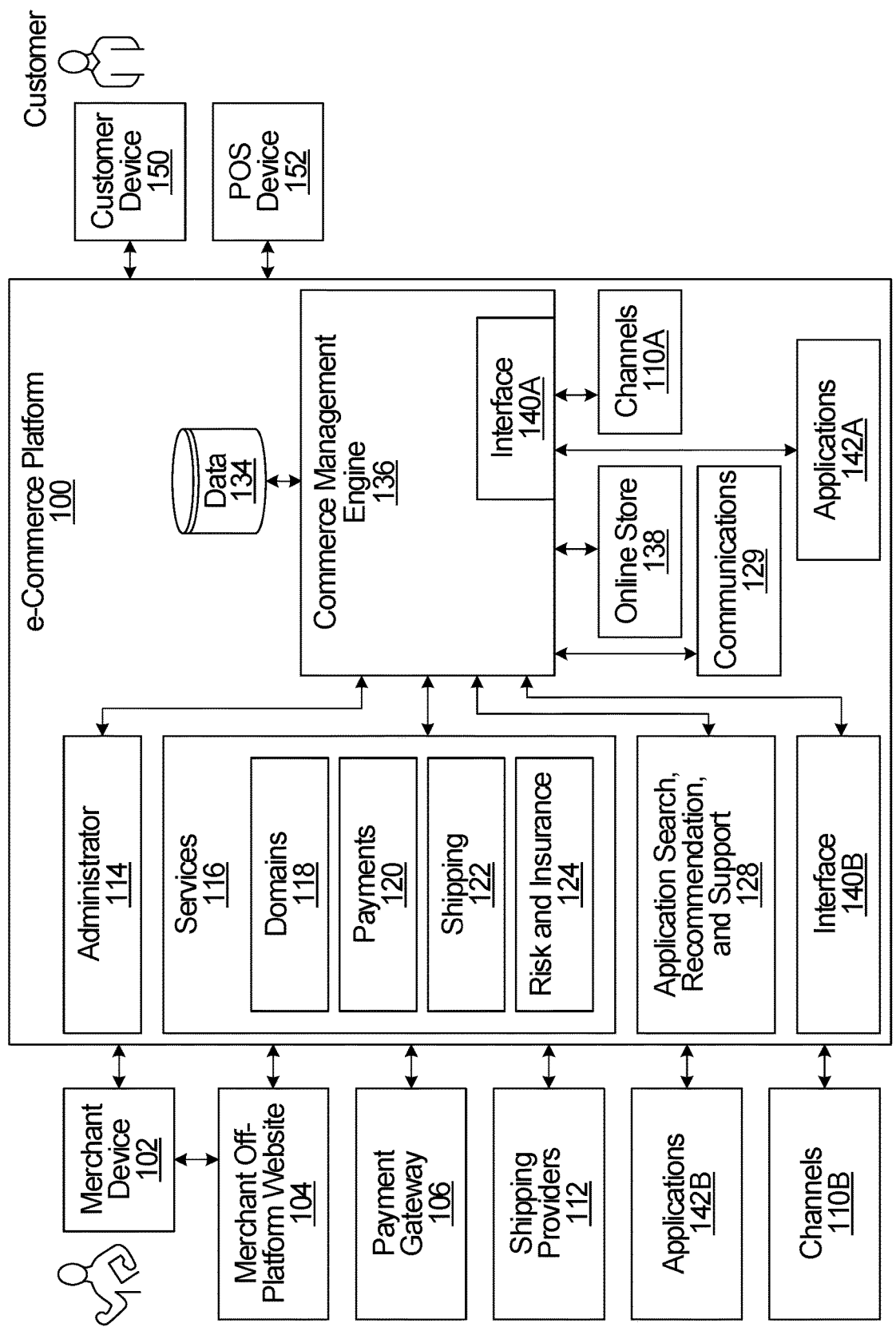
FIG. 12 is a block diagram of an e-commerce platform, according to some embodiments.

FIG. 12 illustrates an example e-commerce platform 100, according to some embodiments. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 12, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 13 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 13. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 12, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In some embodiments, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Figure 14:
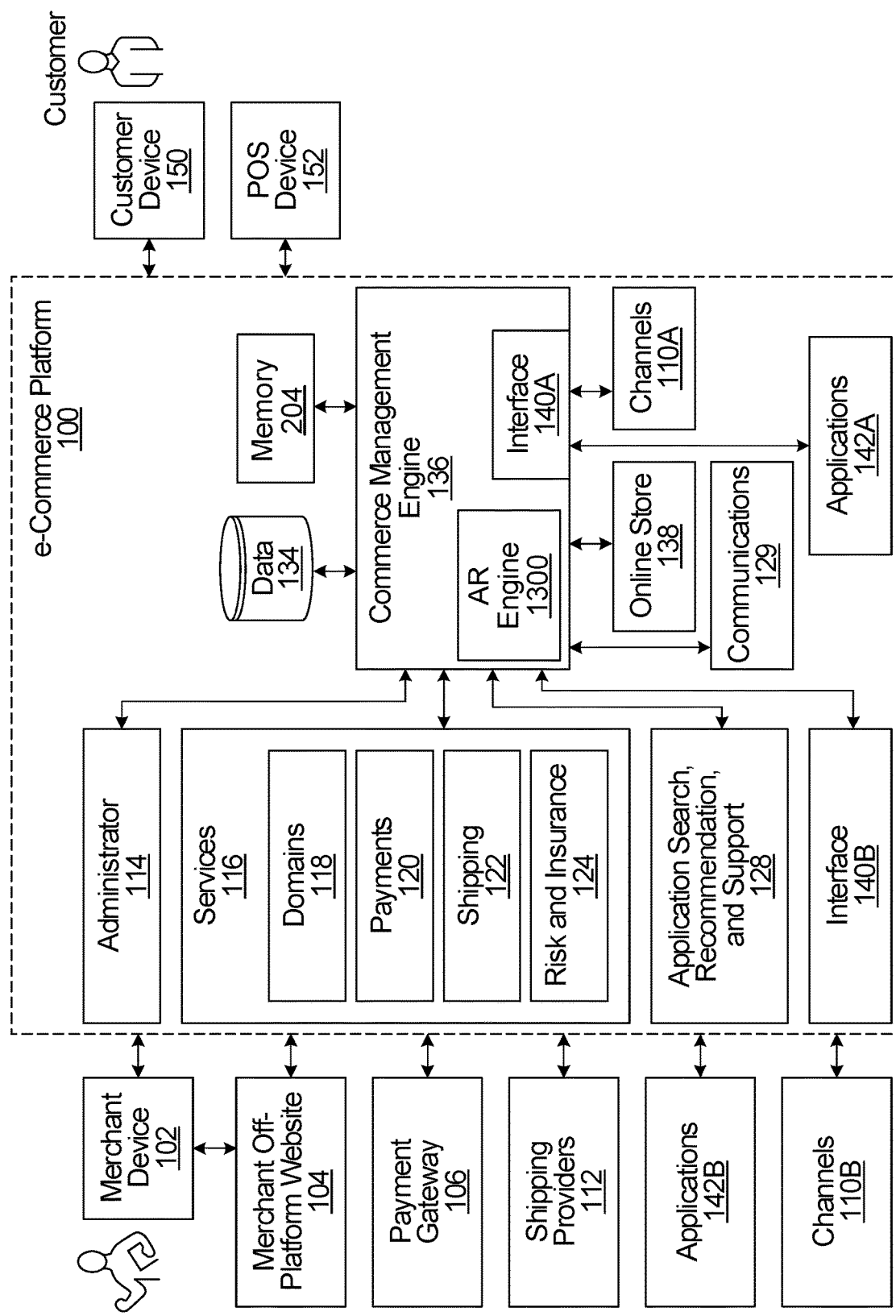
FIG. 14 illustrates the e-commerce platform of FIG. 12, but including an AR engine.

FIG. 14 illustrates the e-commerce platform 100 of FIG. 12, but with the addition of an AR engine 1300 and a memory 204. The AR engine 1300 is an example of a computer-implemented system that generates AR content for use by the e-commerce platform 100, the customer device 150 and/or the merchant device 102. In some embodiments, the AR engine 1300 may be AR engine 402. Although the AR engine 1300 is illustrated as a distinct component of the commerce management engine 136 of e-commerce platform 100 in FIG. 14, this is only an example. An AR engine could also or instead be provided by another component residing within or external to the e-commerce platform 100. In some embodiments, either or both of the applications 142A-B provide an AR engine that is available to customers and/or to merchants. The AR engine 1300 may be implemented by one or more general-purpose processors that execute instructions stored in a memory (e.g. in memory 204) or stored in another computer-readable medium. The instructions, when executed, cause the AR engine 1300 to perform the operations of the AR engine 1300, e.g., the operations described earlier in relation to FIGS. 2 and/or 3. Alternatively, some or all of the AR engine 1300 may be implemented using dedicated circuitry, such as an ASIC, a GPU, or a programmed FPGA.

In some embodiments, the e-commerce platform 100 may include multiple AR engines that are provided by one or more parties. The multiple AR engines may be implemented in the same way, in similar ways and/or in distinct ways. In some embodiments, at least a portion of an AR engine may be implemented in the merchant device 102 and/or in the customer device 150. For example, the customer device 150 may store and run AR engine 1300 locally as a software application.

The AR engine 1300 may implement at least some of the functionality described herein. Although the embodiments described above may be implemented in association with an e-commerce platform, such as (but not limited to) the e-commerce platform 100, the embodiments described are not limited to the specific e-commerce platform 100 of FIGS. 12 to 14. Further, the embodiments described herein do not necessarily need to be implemented in association with or involve an e-commerce platform at all. In general, any applications of AR could implement the systems and methods disclosed herein.

CONCLUSION

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The invention claimed is:

1. A computer-implemented method comprising:
    detecting a first set of features on a physical object in a real-world space within a visual field of view;
    anchoring augmented reality (AR) content to the physical object using the detected first set of features;
    detecting a second set of features on an occluding object in the real-world space within the visual field of view; and
    responsive to the occluding object occluding one or more features of the detected first set of features, anchoring the AR content to both the occluding object using the detected second set of features and the physical object using one or more of the detected first set of features that is not occluded by the occluding object,
    wherein anchoring the AR content to both the occluding object and the physical object comprises:

aligning the AR content with the physical object by rendering the AR content overlaid over at least a portion of the physical object with an element of the AR content aligned with a respective element of the physical object; and maintaining the aligning during movement of both the occluding object and the physical object;

and wherein the anchoring the AR content to both the occluding object and the physical object is further responsive to determining that the one or more of the detected first set of features that is not occluded by the occluding object and the detected second set of features on the occluding object are moving together.

2. The computer-implemented method of claim 1, wherein the element of the AR content is an axis of the AR content, and the respective element of the physical object is an axis of the physical object.

3. The computer-implemented method of claim 1, wherein the element of the AR content is a shape of at least a portion of the AR content, and the respective element of the physical object is a shape of at least a portion of the physical object.

4. The computer-implemented method of claim 1, wherein the determining that the one or more of the detected first set of features that is not occluded by the occluding object and the detected second set of features on the occluding object are moving together comprises detecting that a distance between a first feature of the one or more of the detected first set of features that is not occluded by the occluding object and a second feature of the detected second set of features on the occluding object is substantially constant.

5. The computer-implemented method of claim 1, wherein the anchoring the AR content to the occluding object is further responsive to determining that the occluding object is in contact with the physical object.

6. The computer-implemented method of claim 1, wherein the AR content is anchored to the physical object at a first alignment wherein a boundary of the AR content closest to the occluding object is not aligned with a respective boundary of the physical object closest to the occluding object, the method further comprising:

detecting that the occluding object is approaching the physical object from a particular direction; and responsive to the detecting that the occluding object is approaching the physical object from the particular direction, modifying the anchoring of the AR content to the physical object to a second alignment wherein the boundary of the AR content closest to the occluding object is aligned with the respective boundary of the physical object closest to the occluding object.

7. The computer-implemented method of claim 1 further comprising:

prior to anchoring the AR content to the physical object, overlaying the AR content over at least a portion of the physical object;

maintaining the AR content at a fixed position while the physical object moves;

receiving an input indicating that the AR content is to anchor to the physical object; and anchoring the AR content to the physical object, wherein the anchoring the AR content to the physical object occurs subsequent to receiving the input.

8. The computer-implemented method of claim 1 further comprising:

responsive to the occluding object no longer occluding the one or more features of the detected first set of features, anchoring the AR content to the physical object using the detected first set of features.

9. A system comprising:

at least one processor; and a memory storing processor-executable instructions that, when executed, cause the at least one processor to:

detect a first set of features on a physical object in a real-world space within a visual field of view;

anchor augmented reality (AR) content to the physical object using the detected first set of features;

detect a second set of features on an occluding object in the real-world space within the visual field of view; and responsive to the occluding object occluding one or more features of the detected first set of features, anchor the AR content to both the occluding object using the detected second set of features and the physical object using one or more of the detected first set of features that is not occluded by the occluding object, wherein the at least processor is to anchor the AR content to both the occluding object and the physical object by performing operations including:

aligning the AR content with the physical object by rendering the AR content overlaid over at least a portion of the physical object with an element of the AR content aligned with a respective element of the physical object; and maintaining the aligning during movement of both the occluding object and the physical object and wherein the at least one processor is to anchor the AR content to both the occluding object and the physical object further responsive to determining that the one or more of the detected first set of features that is not occluded by the occluding object and the detected second set of features on the occluding object are moving together.

10. The system of claim 3, wherein the at least one processor is to determine that the one or more of the detected first set of features that is not occluded by the occluding object and the detected second set of features on the occluding object are moving together by performing operations including detecting that a distance between a first feature of the one or more of the detected first set of features that is not occluded by the occluding object and a second feature of the detected second set of features on the occluding object is substantially constant.

11. The system of claim 9, wherein the at least one processor is to anchor the AR content to the occluding object further responsive to determining that the occluding object is in contact with the physical object.

12. The system of claim 9, wherein the AR content is anchored to the physical object at a first alignment wherein a boundary of the AR content closest to the occluding object is not aligned with a respective boundary of the physical object closest to the occluding object, and the at least one processor is further to:

detect that the occluding object is approaching the physical object from a particular direction; and responsive to the detecting that the occluding object is approaching the physical object from the particular direction, modify the anchoring of the AR content to the physical object to a second alignment wherein the boundary of the AR content closest to the occluding object is aligned with the respective boundary of the physical object closest to the occluding object.

13. The system of claim 9, wherein the at least one processor is further to:

prior to anchoring the AR content to the physical object, overlay the AR content over at least a portion of the physical object;

maintain the AR content at a fixed position while the physical object moves;

receive an input indicating that the AR content is to anchor to the physical object; and anchor the AR content to the physical object, wherein the anchoring the AR content to the physical object occurs subsequent to receiving the input.

14. The system of claim 9, wherein the at least one processor is further to:

responsive to the occluding object no longer occluding the one or more features of the detected first set of features, anchor the AR content to the physical object using the detected first set of features.

15. The system of claim 9, wherein the element of the AR content is an axis of the AR content, and the respective element of the physical object is an axis of the physical object.

16. The system of claim 9, wherein the element of the AR content is a shape of at least a portion of the AR content, and the respective element of the physical object is a shape of at least a portion of the physical object.

17. A non-transitory computer readable medium having stored thereon computer-executable instructions that, when executed by a computer, cause the computer to perform operations comprising:

detecting a first set of features on a physical object in a real-world space within a visual field of view;

anchoring augmented reality (AR) content to the physical object using the detected first set of features;

detecting a second set of features on an occluding object in the real-world space within the visual field of view; and responsive to the occluding object occluding one or more features of the detected first set of features, anchoring the AR content to both the occluding object using the detected second set of features and the physical object using one or more of the detected first set of features that is not occluded by the occluding object, wherein anchoring the AR content to both the occluding object and the physical object comprises:

aligning the AR content with the physical object by rendering the AR content overlaid over at least a portion of the physical object with an element of the AR content aligned with a respective element of the physical object; and maintaining the aligning during movement of both the occluding object and the physical object;

and wherein the anchoring the AR content to both the occluding object and the physical object is further responsive to determining that the one or more of the detected first set of features that is not occluded by the occluding object and the detected second set of features on the occluding object are moving together.

18. The non-transitory computer readable medium of claim 17, wherein the determining that the one or more of the detected first set of features that is not occluded by the occluding object and the detected second set of features on the occluding object are moving together comprises detecting that a distance between a first feature of the one or more of the detected first set of features that is not occluded by the occluding object and a second feature of the detected second set of features on the occluding object is substantially constant.

19. The non-transitory computer readable medium of claim 17, wherein the anchoring the AR content to the occluding object is further responsive to determining that the occluding object is in contact with the physical object.

20. The non-transitory computer readable medium of claim 17, wherein the AR content is anchored to the physical object at a first alignment wherein a boundary of the AR content closest to the occluding object is not aligned with a respective boundary of the physical object closest to the occluding object, the method further comprising:

detecting that the occluding object is approaching the physical object from a particular direction; and responsive to the detecting that the occluding object is approaching the physical object from the particular direction, modifying the anchoring of the AR content to the physical object to a second alignment wherein the boundary of the AR content closest to the occluding object is aligned with the respective boundary of the physical object closest to the occluding object.

21. The non-transitory computer readable medium of claim 17 further comprising:

prior to anchoring the AR content to the physical object, overlaying the AR content over at least a portion of the physical object;

maintaining the AR content at a fixed position while the physical object moves;

receiving an input indicating that the AR content is to anchor to the physical object; and anchoring the AR content to the physical object, wherein the anchoring the AR content to the physical object occurs subsequent to receiving the input.

* * * * *